United States Patent
Schliwa-Bertling et al.

(10) Patent No.: US 9,705,793 B2
(45) Date of Patent: Jul. 11, 2017

(54) METHOD FOR INFORMING A NODE IN A RADIO ACCESS NETWORK (RAN) ABOUT A TYPE OF SERVICE ASSOCIATED WITH AN IP PACKET

(71) Applicant: TELEFONAKTIEBOLAGET L M ERICSSON (PUBL), Stockholm (SE)

(72) Inventors: Paul Schliwa-Bertling, Ljungsbro (SE); Jari Vikberg, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/435,287

(22) PCT Filed: Oct. 15, 2012

(86) PCT No.: PCT/SE2012/051103
§ 371 (c)(1),
(2) Date: Apr. 13, 2015

(87) PCT Pub. No.: WO2014/062101
PCT Pub. Date: Apr. 24, 2014

(65) Prior Publication Data
US 2015/0256454 A1  Sep. 10, 2015

(51) Int. Cl.
*H04L 12/28* (2006.01)
*H04L 12/741* (2013.01)
(Continued)

(52) U.S. Cl.
CPC .......... *H04L 45/74* (2013.01); *H04L 47/2408* (2013.01); *H04L 47/2491* (2013.01);
(Continued)

(58) Field of Classification Search
USPC ...................... 370/230, 392, 395.4
See application file for complete search history.

(56) References Cited

U.S. PATENT DOCUMENTS 8,180,388 B1  5/2012 Ghaus
2005/0073953 A1*  4/2005 Kekki .................. H04W 28/24
370/230

(Continued)

FOREIGN PATENT DOCUMENTS

WO  2011124261 A1  10/2011
WO  WO 2012/026855 A1 *  3/2012  ............ H04L 29/06
(Continued)

OTHER PUBLICATIONS

NTT Docomo: "Concerns of using DSCP based solutions for SIRIG and way forward," SA2#91, Kyoto, May 17, 2012.

*Primary Examiner* — Phuongchau Ba Nguyen

(57) ABSTRACT

A core network node for informing a node in a RAN about a type of service associated with an IP packet to be delivered to the node in the RAN, and a RAN node for delivering a received packet to a terminal are provided. The core network node receives the IP packet from a packet data network, the IP packet having an IP header comprising an original DSCP value, and determines a type of service associated with the packet. The core network node determines a second DSCP value based at least partly on the type of service of the packet, and adds the determined second DSCP value to the header. The core network node forwards the IP packet to the RAN node, to subsequently be delivered to a destination terminal. Thereby the RAN node is able to identify the type of service based on the second DSCP value for further processing of the packet when delivering the IP packet to the destination terminal.

22 Claims, 12 Drawing Sheets

(51) Int. Cl.
   *H04W 28/10* (2009.01)
   *H04L 12/857* (2013.01)
   *H04L 12/851* (2013.01)
   *H04L 29/06* (2006.01)
   *H04L 12/801* (2013.01)

(52) U.S. Cl.
   CPC ............ *H04L 69/22* (2013.01); *H04W 28/10* (2013.01); *H04L 47/14* (2013.01)

(56) References Cited

U.S. PATENT DOCUMENTS

| | | | |
|---|---|---|---|
| 2008/0037572 A1* | 2/2008 | Sebire | H04L 47/10 370/412 |
| 2008/0212593 A1* | 9/2008 | Niska | H04L 47/10 370/400 |
| 2009/0016282 A1* | 1/2009 | Gasparroni | H04L 45/24 370/329 |
| 2009/0296613 A1 | 12/2009 | Kahn et al. | |
| 2010/0260129 A1* | 10/2010 | Ulupinar | H04L 12/4633 370/329 |
| 2011/0142061 A1* | 6/2011 | Wang | H04L 12/2834 370/401 |
| 2012/0106463 A1* | 5/2012 | McBride | H04W 28/24 370/329 |
| 2014/0064080 A1* | 3/2014 | Stevens | H04L 47/2441 370/235 |

FOREIGN PATENT DOCUMENTS

| | | | |
|---|---|---|---|
| WO | 2013143579 A1 | 10/2013 | |
| WO | WO 2013/143579 A1 * | 10/2013 | ............ H04W 28/06 |

\* cited by examiner

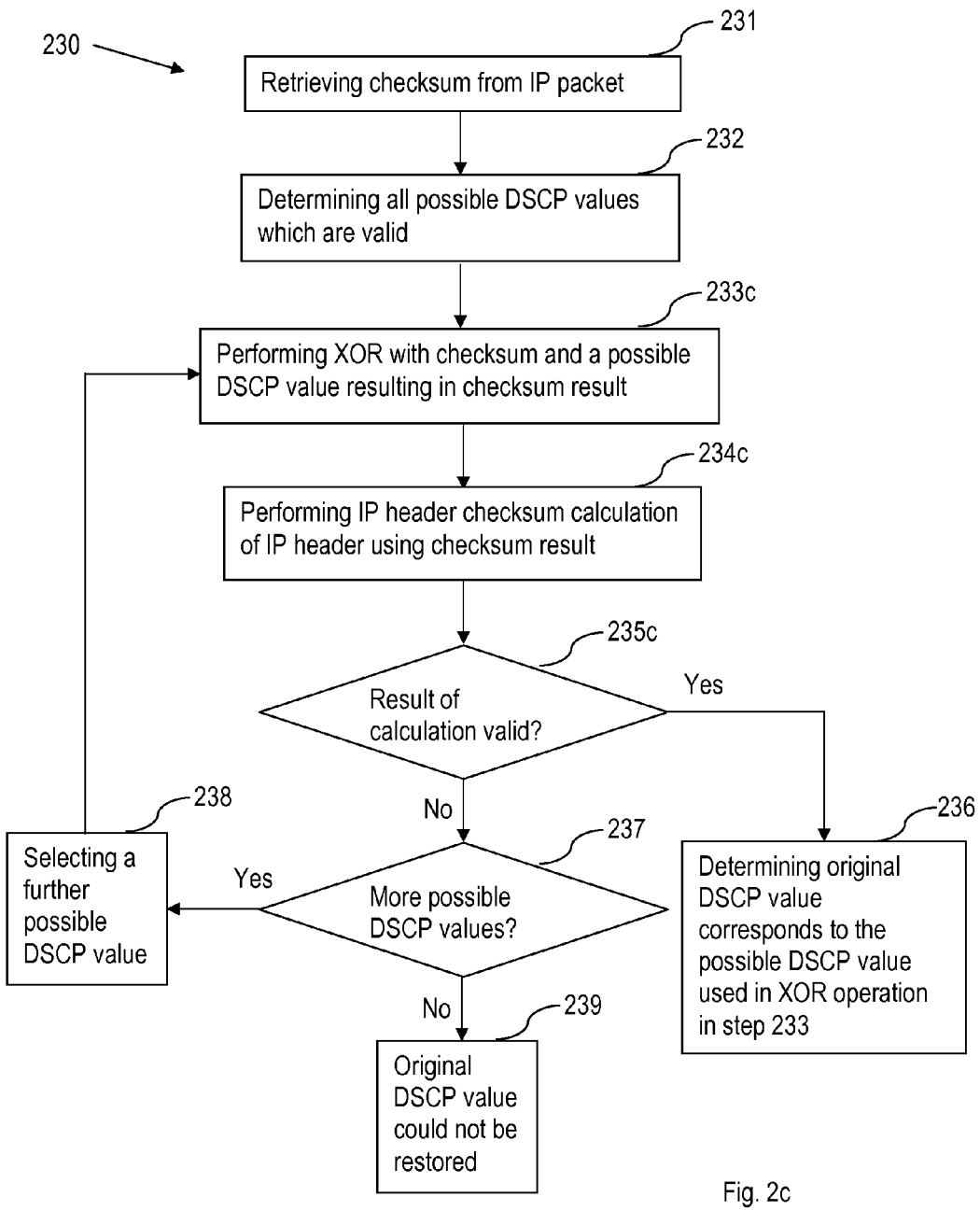

METHOD FOR INFORMING A NODE IN A RADIO ACCESS NETWORK (RAN) ABOUT A TYPE OF SERVICE ASSOCIATED WITH AN IP PACKET

This application is a 371 of PCT/SE2012/051103, filed Oct. 15, 2012, the disclosure of which is fully incorporated herein by reference.

TECHNICAL FIELD

The present disclosure relates to delivering an IP packet to a destination terminal and in particular to deliver the IP packet taking into account at least a service type of the IP packet.

BACKGROUND

For certain applications it is essential to apply service aware QoS-control to a large portion of the User Equipments, UEs, connected to a mobile communication network. An example of this is e.g. to in case of congestion be able to down prioritize IP-packets belonging to background type services in order to reduce the impact on services that are more sensitive from an end user point of view.

The procedures defined by $3^{rd}$ Generation Partnership Project, 3GPP, to support dedicated bearers in $3^{rd}$ Generation communication networks, 3G, and Evolved Packet Core, EPC/Long Term Evolution, LTE, based communication networks require support of specific functionality in the UE. At present there are in principle no 3G UEs that supports this functionality. For LTE the dedicated bearer has been defined from the start and it can probably be assumed that most UEs will have this kind of support, however, there might be scenarios where service differentiation is preferable without the need to trigger a new bearer setup. One has to keep in mind that each bearer setup requires signalling overhead between the network and the UE. There will, for a long time, be a relatively large portion of the UEs that are lacking support for dedicated bearers which will significantly limit the possibility for an efficient result of down prioritizing background type traffic in congestion situations.

One solution to convey the information regarding the type of service, i.e. application, traffic pattern, device type, subscription type or combination of any of those, is to use some specific General Packet Radio Service Tunnelling Protocol User Plane, GTP-U, header fields to transmit the service type information from e.g. the Gateway GPRS Support Node, GGSN, or Serving Gateway, SGW, or Packet Data Network Gateway, PDN-GW, down to the RAN. In the case of Global System for Mobile communication EDGE Radio Access Network, GERAN, the information would need to be also transmitted from the Serving GPRS Support Node, SGSN, to the RAN using Base Station System GPRS Protocol, BSSGP, header fields (i.e. first using GTP-U from the GGSN to the SGSN and the BSSGP from the SGSN to the BSC/PCU). The main reason for this is that the SGSN may perform ciphering on the IP packets before forwarding the IP packet to the RAN. Therefore the IP packet may not be readable in the RAN and other means like the GTP-U header field marking are needed for this case.

The usage of a GTP-U header field has some limitations as the GTP-U protocol is initiated in the downlink first from the GGSN or SGW/PDN-GW. This effectively prohibits the placement of the DPI functionality above these nodes. However, mobile operators do currently have DPI functionality implemented above these nodes, hence the mobile operators are severely restricted in where to place or implement DPI functionality when using the GTP-U header field. It shall be pointed out that there are other packet networks than those defined by 3GPP and the same objects and problem may apply to them with regards to how to handle e.g. QoS, congestion situations. This disclosure is not limited to 3GPP networks but applicable to any packet networks.

SUMMARY

The object is to obviate at least some of the problems outlined above. In particular, it is an object to provide a node in a core network and a method therein for informing a node in a RAN about a type of service associated with an IP packet to be delivered to the node in the RAN. It is further an object to provide a node in a RAN and a method therein for delivering a received IP packet to a destination terminal, the IP packet being received from the node in the core network. These objects and others may be obtained by providing a node in a core network and a node in a RAN and respective methods in, or performed by the node in a core network and the node in the RAN respectively according to the independent claims attached below.

According to an aspect a method in a node in a core network for informing a node in a RAN about a type of service associated with an IP packet to be delivered to the node in the RAN is provided. The method comprises receiving the IP packet from a packet data network, the IP packet having an IP header comprising an original Differentiated Services Code Point, DSCP, value; and determining a type of service associated with the IP packet based on information comprised in the IP packet. The method further comprises determining a second DSCP value based at least partly on the type of service of the IP packet; and adding the determined second DSCP value to the IP header of the IP packet. Further, the method comprises forwarding the IP packet to the node in the RAN, to subsequently be delivered to a destination terminal, thereby enabling the node in the RAN to identify the type of service based on the second DSCP value for further processing of the IP packet when delivering the IP packet to the destination terminal.

According to an aspect, a method in a RAN for delivering a received IP packet to a destination terminal, the IP packet being received from the node in the core network is provided. The method comprises receiving the IP packet from the node in the core network; and retrieving a DSCP value comprised in an IP header of the IP packet. The method further comprises determining an original DSCP value based on the IP header of the IP packet; and replacing the retrieved DSCP value with the original DSCP value. Further, the method comprises delivering the IP packet to the destination terminal using the DSCP value comprised in the IP header.

According to still an aspect, a node in a core network adapted for informing a node in a RAN about a type of service associated with an IP packet to be delivered to the node in the RAN is provided. The node in the core network comprises a processing unit adapted to receive the IP packet from a packet data network, the IP packet having an IP header comprising an original value; and to determine a type of service associated with the IP packet based on information comprised in the IP packet. The processing unit is adapted to determine a second DSCP value based at least partly on the type of service of the IP packet; and to add the determined second DSCP value to the IP header of the IP packet. Further, the processing unit is adapted to forward the IP packet to the node in the RAN, to subsequently be delivered to the destination terminal, thereby enabling the node in the RAN to identify the type of service based on the second DSCP value for further processing of the IP packet when delivering the IP packet to the destination terminal.

According to yet an aspect, a node in a RAN adapted for delivering a received IP packet to a destination terminal, the IP packet being received from the node in the core network. The node in the RAN comprises a processing unit adapted to receive the IP packet from the node in the core network; and to retrieve a DSCP value comprised in an IP header of the IP packet. The processing unit is also adapted to determine an original DSCP value based on the IP header of the IP packet; and to replace the retrieved DSCP value with the original DSCP value. Further, the processing unit is adapted to deliver the IP packet to the destination terminal using the DSCP value comprised in the IP header.

The node in the core network, the node in the RAN and the respective method therein have several advantages. One advantage is that the node in the RAN is enabled to identify the type of service based on the second DSCP value for further processing of the IP packet when delivering the IP packet to the destination terminal. The node in the RAN is also enabled to recover the original DSCP value such that no IP packets will be dropped due to unexpected DSCP value at the receiving destination terminal.

BRIEF DESCRIPTION OF DRAWINGS

Embodiments will now be described in more detail in relation to the accompanying drawings, in which:

FIG. 2c is a flowchart of a method in a node in a RAN for delivering a received IP packet to a destination terminal according to yet another exemplifying embodiment.

DETAILED DESCRIPTION

Briefly described, exemplifying embodiments of a node in a core network and a method therein are provided for informing a node in a Radio Access Network, RAN, about a type of service associated with an IP packet to be delivered to the node in the RAN. Exemplifying embodiments of a node in the RAN and the method therein are provided for delivering the received IP packet to a destination terminal. The node in the core network informs the node in the RAN about the type of service associated with an IP packet by means of adding or inserting a value or parameter into the IP header of the packet, which the receiving node in the RAN is able to use for delivering the IP packet to the destination terminal. By the wording "use" in the previous sentence is meant that the RAN uses the service type information to apply specific means when delivering the IP packet to the destination terminal, this is described in more detail below.

One solution to convey information regarding the type of service, i.e. application, traffic pattern, device type, subscription type or combination of any of those, is to include the information in a user plane Packet Data Unit, PDU, transmitted from the 3GPP Packet Core, CN/Core Network, CN, to the 3GPP Radio Access Network, RAN. One example of this is to use Deep Packet Inspection, DPI in the CN to retrieve the information regarding the type of service and then use the code points in the DSCP-field of the user plane IP "PDU" to transfer the retrieved information to the 3GPP RAN. The 3GPP RAN can then be configured to apply some preferred Radio Resource Management, RRM, strategies as a function of the code point received in the DSCP-field.

Figure 1A:
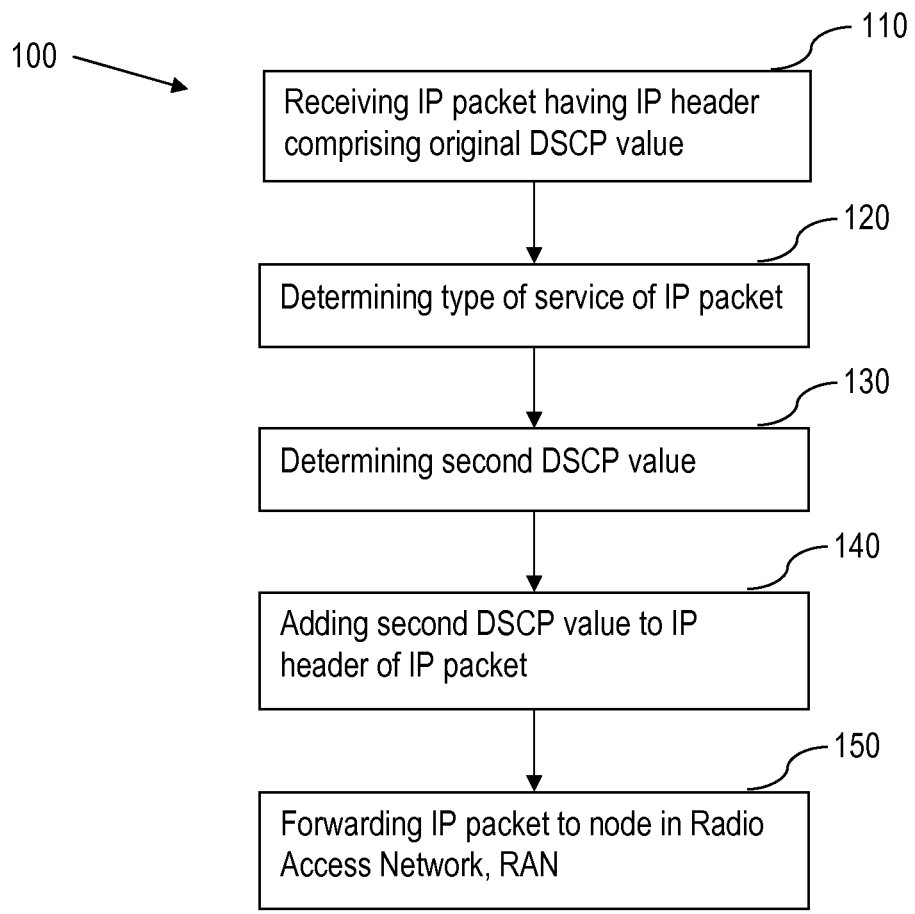
FIG. 1a is a flowchart of a method in a node in a core network for informing a node in a Radio Access Network, RAN, about a type of service associated with an IP packet to be delivered to the node in the RAN, according to an exemplifying embodiment.

An exemplifying embodiment of a method 100 in, or performed by, a node in a core network for informing a node in a Radio Access Network, RAN, about a type of service associated with an IP packet to be delivered to the node in the RAN is illustrated in FIG. 1a. FIG. 1a illustrates the method comprising receiving 110 the IP packet from a packet data network, the IP packet having an IP header comprising an original Differentiated Services Code Point, DSCP, value; and determining 120 a type of service associated with the IP packet based on information comprised in the IP packet. The method further comprises determining 130 a second DSCP value based at least partly on the type of service of the IP packet; and adding 140 the determined second DSCP value to the IP header of the IP packet. Further, the method comprises forwarding 150 the IP packet to the node in the RAN, to subsequently be delivered to a destination terminal, thereby enabling the node in the RAN to identify the type of service based on the second DSCP value for further processing of the IP packet when delivering the IP packet to the destination terminal.

The core network is part of a (wireless) communication network, e.g. a Long Term Evolution, LTE, communication network, Wideband Code Division Multiple Access, WCDMA/High Speed Packet Access, HSPA, communication network or a General Packet Radio Service, GPRS, communication network. The communication network typically comprises the core network and a RAN wherein a user terminal gains access to the communication network by means of the RAN. Both the core network and the RAN may comprise a plurality of different nodes, which have different tasks in the communication network. This will be described in more detail later. The communication network is in this disclosure connected to a Packet Data Network, PDN, so that some sort of communication may take place between the two networks, i.e. the communication network and the PDN. In this disclosure, the core network of the communication network is connected to the PDN. Typically, the core network comprises some sort of gateway arranged between the PDN and the core network.

A node in the core network receives 110 an IP packet from the PDN. The IP packet is to be delivered to a destination terminal, i.e. a terminal or station of a subscriber in the communication network. In order to deliver the IP packet to the destination terminal, the core network will forward the packet to a node in the RAN, wherein the node in the RAN will deliver the IP packet to the destination terminal. The IP packet has an IP header comprising an original DSCP value.

When the node in the core network has received the IP packet from the PDN, the node determines 120 a type of service associated with the IP packet based on information comprised in the IP packet. There may be a plurality of different service which is supported by the communication network, e.g. e-mail, voice over IP, data file transfer and so on. Depending on the type of service, the IP packet may be treated or processed differently at some node or nodes in the core network and/or the RAN. The header of the IP packet comprises various types of information comprised in different fields of the IP header. By looking at the IP header, the node in the core network may determine the type of service associated with the IP packet.

As stated above, the IP packet comprises an original DSCP value. This original DSCP value may be set in the PDN and it can be said to constitute a sort of classification of the IP packet. The DSCP value and/or the classification of the IP packet may then be used by any node or router in the communication network in order to apply different prioritisations when processing or handling the packet. By applying different prioritisations when processing or handling the packet, different Quality of Service, QoS, levels may be obtained for the IP packet.

The node in the core network also determines 130 a second DSCP value at least partly based on the type of service of the IP packet. As stated before, depending on the type of service, the IP packet may be treated or processed differently at some node or nodes in the core network and/or the RAN. The second DSCP value is thus determined at least partly based on the type of service of the IP packet, wherein this second DSCP value may influence the way the IP packet will treated or processed at some node or nodes in the core network and/or the RAN.

Once the node in the core network has determined the second DSCP value, the node in the core network adds 140 the determined second DSCP value to the IP header of the IP packet. This enables any node or router receiving the IP packet, either directly or indirectly, from the node in the core network to treat or process the IP packet at least partly based on the second DSCP value.

After adding the second DSCP value to the IP header of the IP packet, the node in the core network forwards 150 the IP packet to the node in the RAN, to subsequently be delivered to a destination terminal.

In this manner, the node in the core network enables the node in the RAN to identify the type of service based on the second DSCP value for further processing of the IP packet when delivering the IP packet to the destination terminal.

The method in the core network as described above has several advantages. One advantage is that the node in the RAN is enabled to identify the type of service based on the second DSCP value for further processing of the IP packet when delivering the IP packet to the destination terminal. The node in the RAN is also enabled to recover the original DSCP value such that no IP packets will be dropped due to unexpected DSCP value at the receiving destination terminal. Further, the method may be implemented in different nodes in the core network making the implementation flexible.

In an example, determining the type of service of the IP packet is performed by Deep Packet Inspection, DPI, on the received IP packet.

In another example, determining the type of service of the IP packet is performed by header inspection of the IP header only.

The node in the core network may inspect the IP packet in different ways in order to obtain or retrieve different kinds of information. One example is IP header inspection or classification. IP header inspection enables the node to obtain information comprised in the different fields of the IP header of the IP packet, e.g. source IP address, source port, Destination IP address, Destination IP port, protocol used on the transport layer and the DSCP value. Another type of inspection is called shallow inspection or stateful inspection. Such an inspection may comprise analysis of transport level protocol state by inspecting the current protocol header, e.g. Transport Control Protocol, TCP, and User Datagram Protocol, UDP. For example, analysing the sequence of TCP header flags like SYN, ACK and FIN tells the state of the connection. Yet another type of inspection is DPI. DPI provides analysis or enables the node to analyse data content on the application layer, e.g. hypertext transfer protocol, HTTP, state, video frame content and so on. In order to determine the type of service of the IP packet, the node in the core network may perform header inspection of the IP header and/or a DPI of the whole IP packet.

In still an example, determining 130 the second DSCP value is based at least partly on the original DSCP value.

The Internet Engineering Task Force, IETF, has in RFC 2474 defined three pools of DSCP values or code points. The first pool comprises 32 values or code points and the first pool is allocated to be used for standardised actions. The second and third pool each comprises 16 values or code points and they are allocated for experimental and local use. For example, DSCP values or code points from the second pool is used for the second DSCP value, which is determined by the node in the core network. The node in the core network generates the second DSCP value from the second pool, based at least partly on the original DSCP value. In more detail, the code points from the second pool are used to encode the value of the DSCP field. In this disclosure, when the node in the core networks determines the second DSCP value, the node determines a DSCP value from the second or the third pool of DSCP values and uses this value to encode the DSCP field in the IP header of the IP packet, the DSCP field comprising the original DSCP value. Hence, the second DSCP value is dependent on, or correlated with, the original DSCP value. In one example, the generation of the second DSCP value from the second pool, based at least partly on the original DSCP value is done by a mapping operation. The mapping operation may work as follows. The node in the core network receives an IP packet with a DSCP value A, i.e. the original DSCP value, wherein value A belongs to the first pool. Values from the other two pools are not used for the original DSCP value. Based on e.g. DPI and some subscriber info and the received DSCP value the node in the packet core network generates a DSCP value from e.g. the second pool, i.e. there is some look-up table description using e.g. a 3-tuple (original DSCP, DPI result, subscriber information) as an input and a DSCP value from the 2nd pool will result as output from the look-up table description. In addition, using a DSCP value or code point from the second or third pool of DSCP values, an indication is given to the node in the RAN that the second DSCP value needs to be mapped back to the original DSCP value of the first pool of DSCP values, which will be described in more detail below. In an example, the second DSCP value is inserted into the DSCP field and the original DSCP value is inserted into an IP header option field.

In yet an example, determining 130 the second DSCP value is based at least partly on a priority associated with the destination receiver of the IP packet.

When the node in the core network performs packet inspection, either the IP header inspection or the DPI described above, the node obtains the destination address of the destination terminal and hence who the subscriber is. The node in the core network may then inquire, or has previously received, information for example from a Home Location Register, HLR, Home Subscriber Server, HSS or a Policy Charging and Rules Function, PCRF, about a QoS level and/or a priority handling level associated with the destination terminal or the user or the subscription. The information may be received directly or via intermediate nodes such as MME or SGSN. Once the node has obtained, or retrieved the QoS level and/or a priority handling level associated with the destination terminal or the user/subscriber, the node may use this information, at least partly, in order to determine the second DSCP value.

Figure 1B:
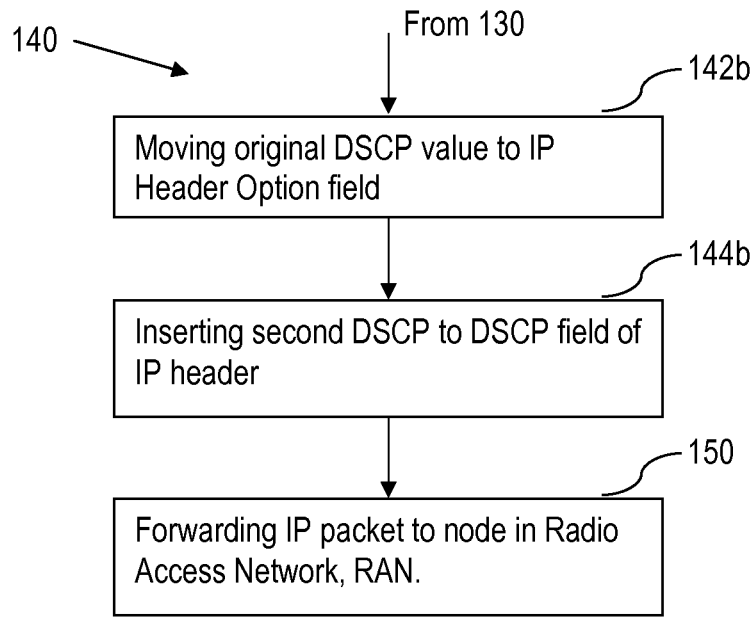
FIG. 1b is a flowchart of a method in a node in a core network for informing a node in a Radio Access Network, RAN, about a type of service associated with an IP packet to be delivered to the node in the RAN, according to another exemplifying embodiment.

In another example, the adding 140 of the determined second DSCP value to the IP header of the IP packet comprises keeping the original DSCP value in the IP header of the IP packet such that both the original and the second DSCP values are comprised in the IP header of the IP packet. This is illustrated in FIG. 1b.

After determining 130 the second DCSP value, the node in the core network first moves 142b the original DSCP value to an IP header option field. This means that the original DSCP value is kept in the IP packet, and even in the IP header of the IP packet. The node in the core network then inserts 144b the determined second DSCP value to the DSCP field of the IP header of the IP packet in order for enabling the node in the RAN to use the second DSCP value when handling or processing the IP packet in order to deliver the IP packet to the destination terminal to which the IP packet is addressed. In this example, the original DSCP value is kept in the IP header so that both DSCP values are comprised in the IP header of the IP packet. The node in the RAN will need to recover the original DSCP value before delivering the IP packet to the destination terminal. In case the destination terminal receives an IP packet comprising a DSCP value which is not comprised in the first pool of DSCP values, the destination terminal may simply discard the packet and hence the packet will be lost. By the IP header comprising both the original and the second DSCP value when the IP packet is received by the node in the RAN, the node in the RAN may use the second DSCP value in order to handle or process the IP packet when delivering the IP packet to the destination terminal, with regards to e.g. QoS, priority and so on. Further, the node in the RAN is enabled to recover the original DSCP value since it is comprised in the IP header together with the second DSCP value.

In still another example, the adding 140 of the determined second DSCP value to the IP header of the IP packet comprises, removing 142c the original DSCP value from a DSCP field of the IP header, inserting 144c the second DSCP value to the DSCP field of the IP header and forwarding 150 the IP packet to the node in the RAN, wherein the second DSCP value has been determined by means of a mapping operation.

Figure 1C:
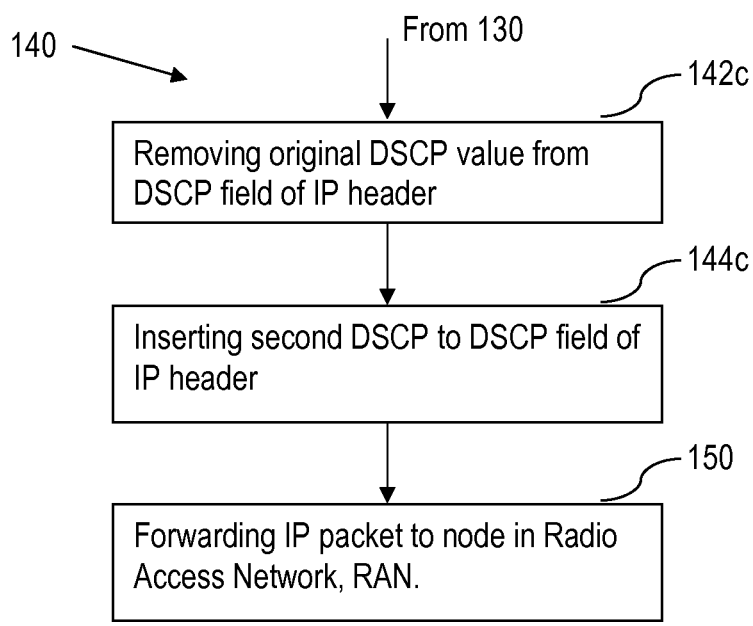
FIG. 1c is a flowchart of a method in a node in a core network for informing a node in a Radio Access Network, RAN, about a type of service associated with an IP packet to be delivered to the node in the RAN, according to another exemplifying embodiment.

This example is illustrated in FIG. 1c. In this example, the original DSCP value is removed 142c from the IP field of the IP header. This means that there is a mapping table in both the node in the core network and the node in the RAN such that the node in the core network determines the second DSCP value at least based on a mapping operation as described above. The node in the RAN may then recover the original DSCP value may performing a reverse mapping operation. This will be explained in more detail below. The node in the core network then inserts 144b the second DSCP value into the DSCP field of the IP header, and forwards 150 the IP packet to the node in the RAN for delivery to the destination terminal.

In an alternative example, the adding 140 of the determined second DSCP value to the IP header of the IP packet comprises replacing 142d the original DSCP value with the second DSCP value and determining 144d an IP header checksum. The method further comprises performing 145d an exclusive OR operation of the original DSCP value and the determined IP header checksum and adding 146d the result of the exclusive or operation to the IP packet before forwarding 150 the IP packet to the node in the RAN.

Figure 1D:
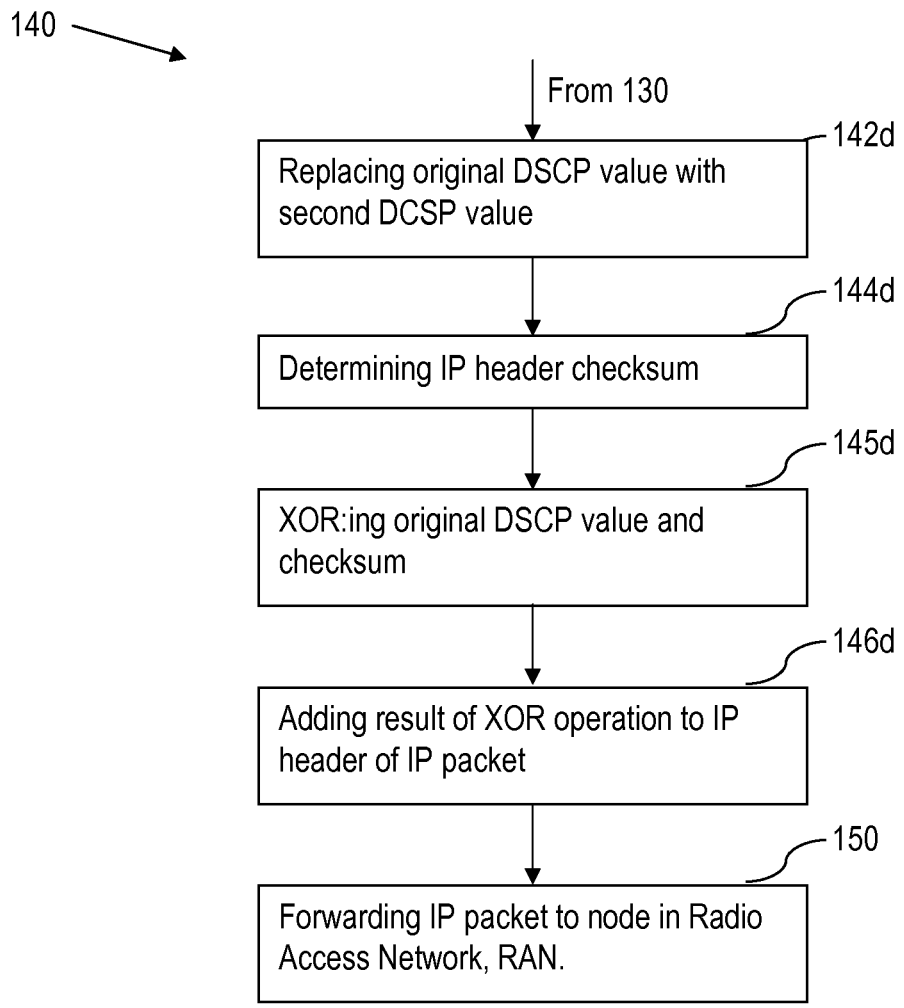
FIG. 1d is a flowchart of a method in a node in a core network for informing a node in a Radio Access Network, RAN, about a type of service associated with an IP packet to be delivered to the node in the RAN, according to another exemplifying embodiment.

This example is illustrated in FIG. 1d. In this example, the node in the core network replaces the original DCSP value in the IP header with the second DSCP value. Once the second DSCP value is comprised in the IP header, the node in the core network determines an IP header checksum and performs an exclusive OR operation of the original DSCP value and the determined IP header checksum. The method further comprises adding the result of the exclusive OR operation to the IP packet before forwarding 150 the IP packet to the node in the RAN. In this manner, the original DSCP value is comprised in the result of the exclusive OR operation and hence the node in the RAN may use the result of the exclusive OR operation to recover the original DSCP value as will be described below.

According to an example, the node in the core network is any of a Packet Data Network Gateway, PDN-GW, a Serving GW, SGW, a Gateway General Packet Radio Service Support Node, GGSN, and a Serving General Packet Radio Service Support Node, SGSN.

Figure 5A:
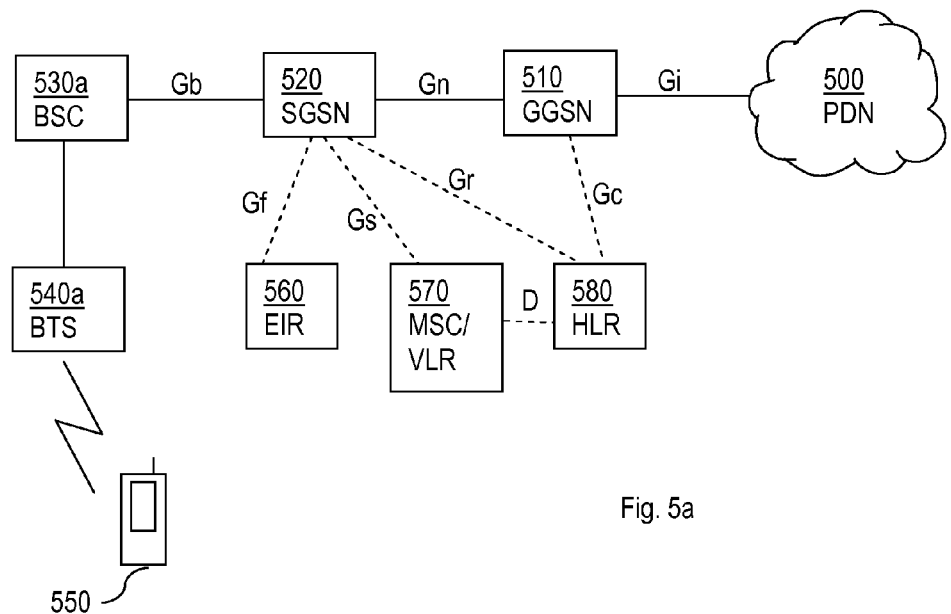
FIG. 5a is a schematic overview of an example of a packet switched communication network connected to a packet data network, PDN.

In the beginning of the detailed description, examples are given of different packet switched (wireless) communication networks. One example of a packet switched (wireless) communication network is the GPRS communication network. Such a network is also illustrated in FIG. 5a, which will be described below. The method in the node in the core network may be implemented in e.g. the GGSN 510 or the SGSN 520. Looking at FIG. 5a, both these core network nodes may communicate with the node in the RAN either directly or indirectly via intermediate node(s), i.e. the BSC 530*a* or the BTS 540*a*, which in turn may communicate with the destination terminal 550 to deliver the IP packet.

Figure 6:
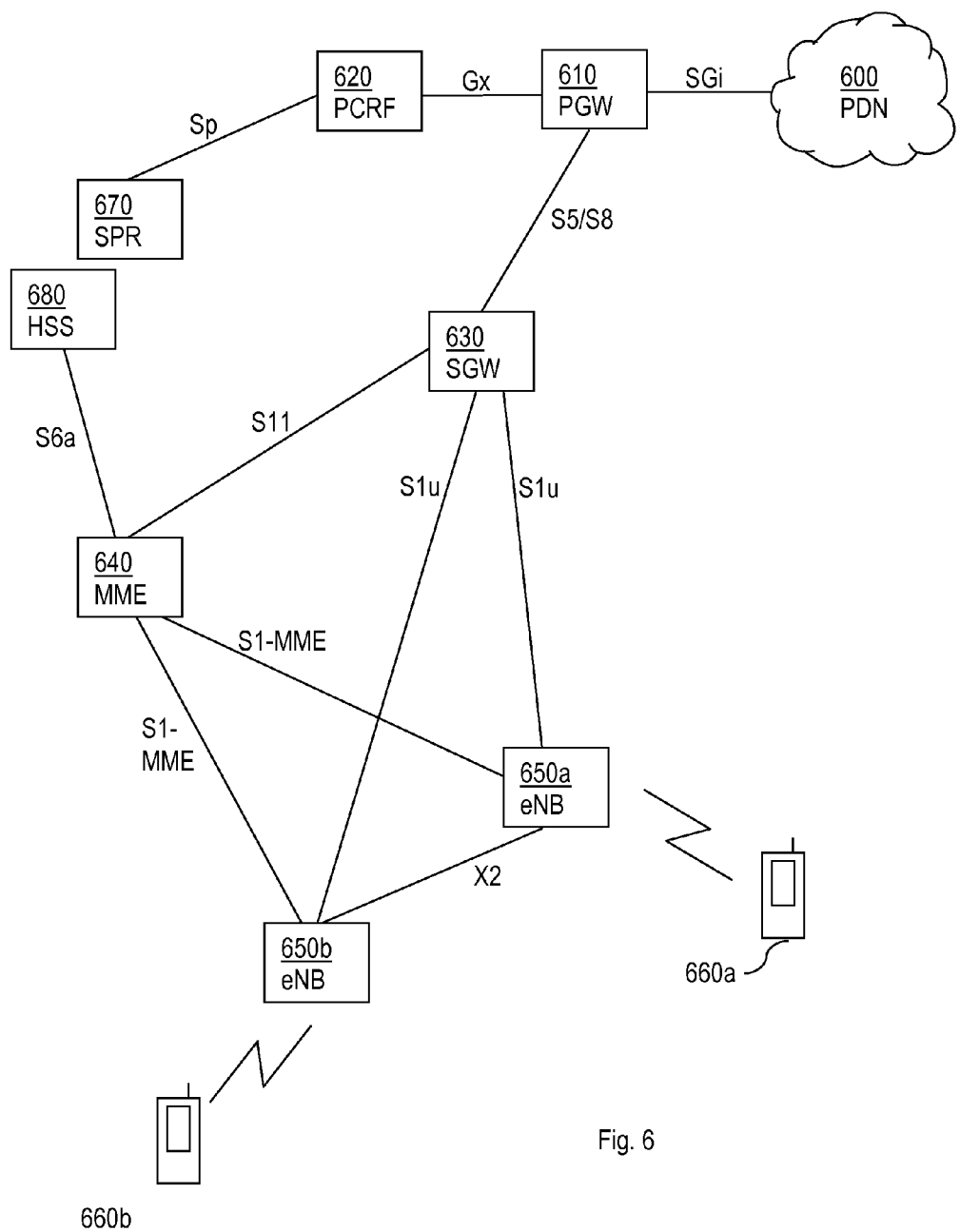
FIG. 6 is a schematic overview of still another example of a packet switched communication network connected to a packet data network, PDN.

FIG. 6 illustrates another example of a packet switched (wireless) communication network, namely the LTE communication network. This will also be described in more detail below. The method in the node in the core network may be implemented in e.g. the PDN-GW (PGW) 610 or the SGW 630. Looking at FIG. 6, both these core network nodes may communicate with the node in the RAN, i.e. the eNB 650*a* or 650*b*, which in turn may communicate with the destination terminal 660*a* or 660*b* to deliver the IP packet It shall be pointed out that the method in the core network may be implemented in other proprietary core network nodes that are not visible in the standard network architecture. One example of such a proprietary core network node is a node placed on the Gi or SGi interface between the GGSN or PDN-GW and the PDN.

Embodiments herein also relate to a method in a node in the RAN for delivering a received IP packet to a destination terminal. The IP packet is received by the node in the RAN from a node in a core network. One exemplifying embodiment of such a method is illustrated in FIG. 2*a*.

Figure 2A:
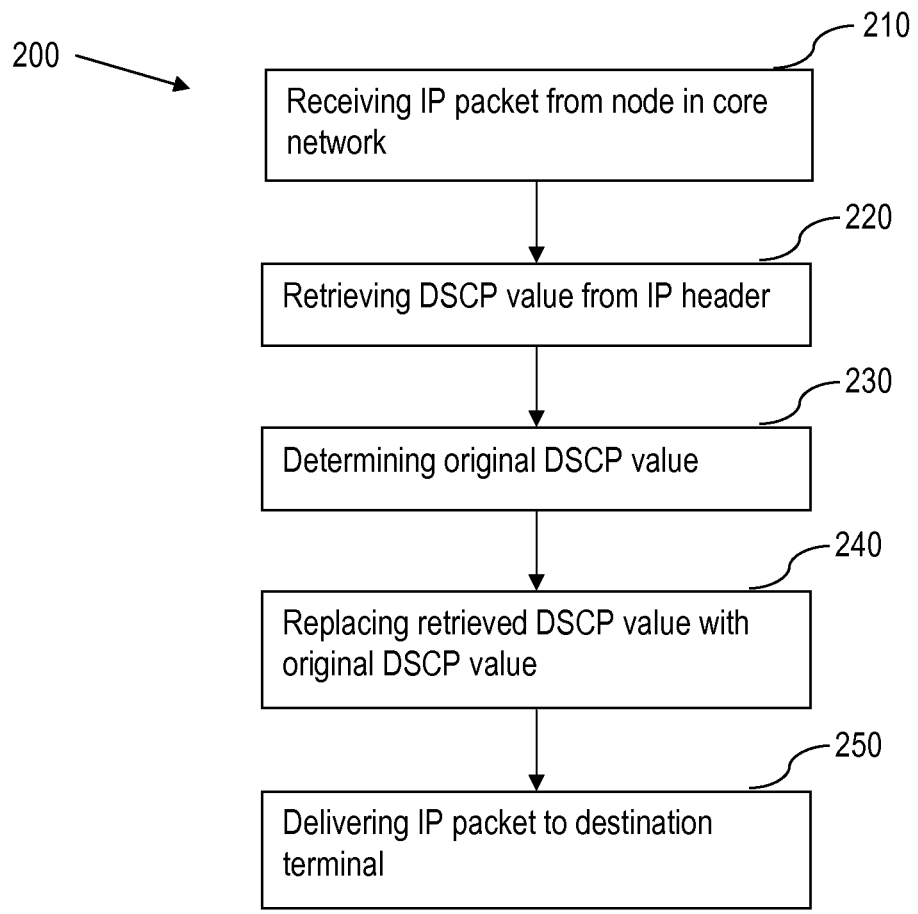
FIG. 2a is a flowchart of a method in a node in a RAN for delivering a received IP packet to a destination terminal according to an exemplifying embodiment.

FIG. 2*a* illustrates the method comprising receiving 210 the IP packet from the node in the core network; and retrieving 220 a DSCP value comprised in an IP header of the IP packet. The method further comprises determining 230 an original DSCP value based on the IP header of the IP packet; and replacing 240 the retrieved DSCP value with the original DSCP value. Further, the method comprises delivering 250 the IP packet to the destination terminal using the DSCP value comprised in the IP header.

The node in the RAN firstly receives 210 the IP packet from the node in the core network. The IP packet comprises an IP header in which a DSCP value is comprised in a DSCP field of the IP header. Comparing to the node in the core network, the DSCP value is the second DSCP value which has been determined and added to the IP header of the core network node. Once the node in the RAN has received the IP packet from the node in the core network, the node in the RAN retrieves 220 the DSCP value comprised in the IP header of the IP packet. As explained above in conjunction with FIGS. 1*a*-1*d*, the DSCP value comprised in the IP header is not the original DSCP value as it was when the node in the core network received the IP packet from the PDN, instead it has been changed to another (called a second DSCP value above) DSCP value which has been generated from the second or third pool of DSCP values as described above. The destination terminal will not recognise such a DSCP value and the destination terminal may simply discard the packet. Hence the node in the RAN determines 230 the original DSCP value based on the IP header, or information comprised in the IP header, of the IP packet. The node in the RAN then replaces the retrieved DSCP value with the determined original DSCP value so that the destination terminal will process the IP packet properly when receiving it. Finally, the node in the RAN delivers 250 the IP packet to the destination terminal at least partly using the retrieved DSCP value comprised in the IP header when the node in the RAN firstly received 210 the IP packet. This retrieved DSCP value corresponds to the above described second DSCP value, described in conjunction with FIGS. 1*a*, 1*b* and 1*c*. The retrieved DSCP value provides information to the node in the RAN how to handle or process the IP packet when delivering it to the destination terminal. The handling or processing of the IP packet may depend on e.g. QoS levels, priority handling levels and so on, which are indicated to the node in the RAN by the retrieved DSCP value. Different other variants are also possible. In yet another example, the retrieving 220 a DSCP value comprised in an IP header of the IP packet means that the DSCP value is retrieved from the DSCP field in the IP header of the IP packet and the determining 230 an original DSCP value means that the original DSCP value is determined from an IP header option field and that this header option field is removed.

The method in the node in the RAN has several advantages. One advantage is that the node in the RAN is enabled to identify the type of service based on the second DSCP value for further processing of the IP packet when delivering the IP packet to the destination terminal. The node in the RAN is also enabled to recover the original DSCP value such that no IP packets will be dropped due to unexpected DSCP value at the receiving destination terminal.

Figure 2B:
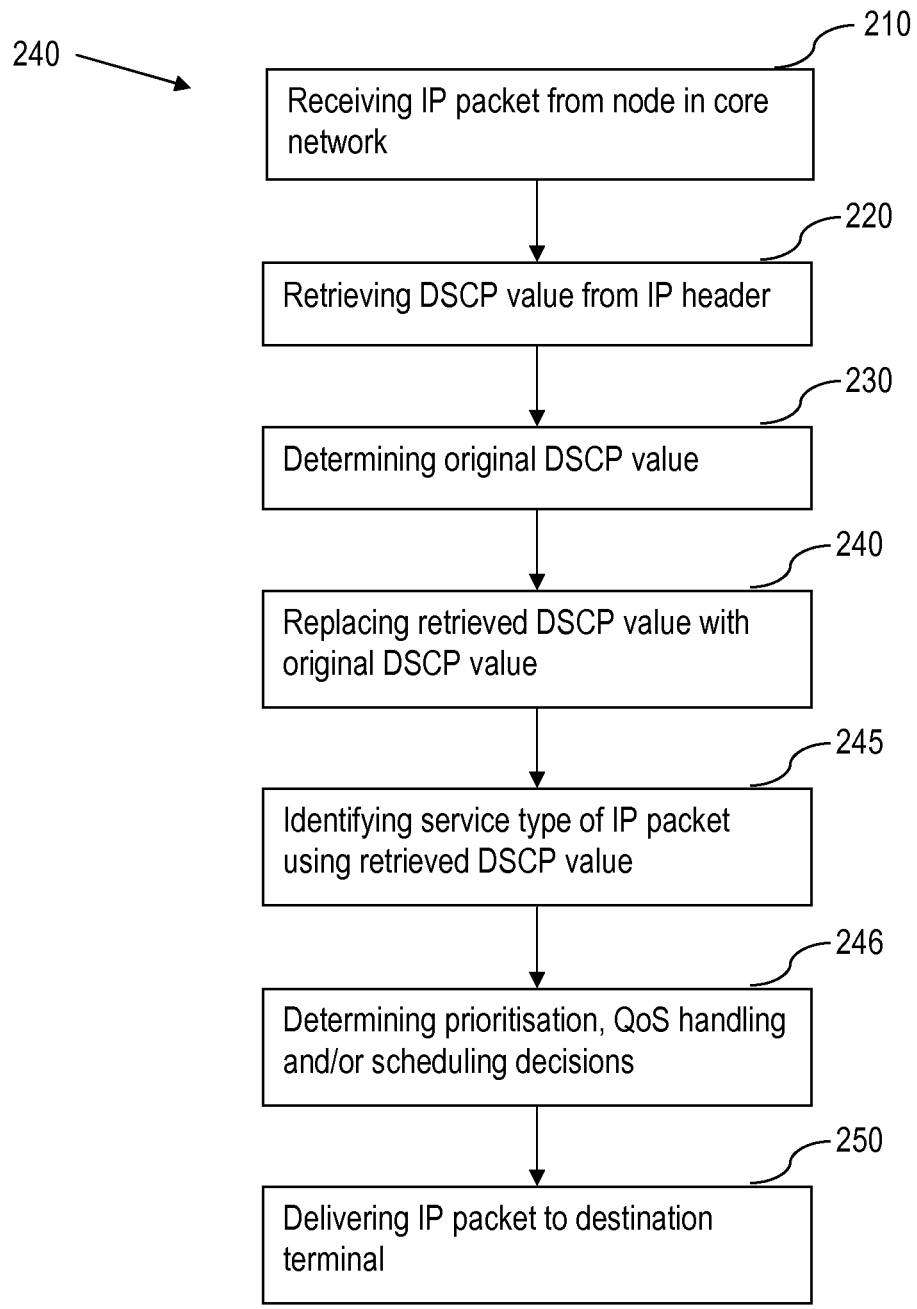
FIG. 2b is a flowchart of a method in a node in a RAN for delivering a received IP packet to a destination terminal according to another exemplifying embodiment.

In an example, illustrated in FIG. 2*b*, the method further comprises identifying 245 a service type using the DSCP value comprised in the IP header, and determining 246, based on the service type, prioritisation, Quality of Service, QoS, handling and/or scheduling decisions to be used for delivering 250 the IP packet to the destination terminal.

The retrieved DSCP value comprised in the IP header of the IP packet when the IP packet is or was received by the node in the RAN was determined by the node in the core network prior to forwarding the IP packet to the node in the RAN. The node in the core network determined the DSCP value (referred to as the second DSCP value when described in conjunction with FIGS. 1*a*-1*d*) at least partly based on e.g. service type, QoS and so on. Hence, the DSCP value in the IP header which is retrieved by the node in the RAN when the nodes has received the IP packet provides information to the node in the RAN how to deliver the IP packet to the destination terminal with regards to e.g. prioritisation, QoS, handling and/or scheduling decisions.

In still an example, determining 230 the original DSCP value comprises retrieving the original DSCP value from the IP header of the IP packet.

Looking back at the method in the node in the core network, in one example, the node in the core network adds the second DSCP value to the IP header of the IP packet and keeps the original DSCP value. However, the original DSCP value is moved to an IP Header Options field in the IP header. Hence, when the node in the RAN receives the IP packet, the IP header comprises both DSCP values. Consequently, the node in the RAN determines the original DSCP value by retrieving it from the IP header of the IP packet, namely from the IP Header Options field of the IP header.

In another example, illustrated in FIG. 2*c*, determining 230 the original DSCP value comprises retrieving 231 a checksum from the IP packet and determining 232 all possible DSCP values which are valid. The method also comprises to for at least one of all possible DSCP values performing 233*c* an exclusive OR operation with the checksum and a possible DSCP value resulting in a checksum result; performing 234*c* an IP header checksum calculation of the IP header using the checksum result; and checking 235*c* if the result from the IP header checksum calculation is valid. If the result is valid, the original DSCP value is determined to correspond to the DSCP value which was used in the exclusive OR operation, and if the result is not valid, then the method steps above are repeated for a further possible DSCP value until a valid result is obtained or until all possible DSCP values have been used in the method steps above.

In this example, the node in the core network has removed the original DSCP value from the IP header of the IP header and replaced it with another determined DSCP value (referred to above in conjunction with FIGS. 1a-1d as the second DSCP value), prior to forwarding it to the node in the RAN. Hence, when the node in the RAN receives the packet, the node in the RAN needs to recover the original DSCP value before delivering the IP packet to the destination terminal. In order for the node in the RAN to be able to recover the original DSCP value, the node in the core network added the checksum from the IP packet in addition to replacing the original DSCP value with the DSCP value present in the IP header when the node in the RAN receives the IP packet.

The node in the RAN determines 232 all possible DSCP values which are valid. As described above, all valid DSCP values are comprised in the first pool of DSCP values. In one example, the node in the RAN stored all possible DSCP values which are valid in a memory comprised in the node in the RAN.

The node in the RAN selects one DSCP value out of all the possible DSCP values which are valid. The node in the RAN performs an exclusive OR operation on the checksum and the selected DSCP value. The checksum operation results in a checksum result.

The node in the RAN then performs an IP header checksum calculation of the IP header using the checksum result, and checks if the result from the IP header checksum calculation is valid. By valid means here that the result from the IP header checksum calculation is zero.

If the IP header checksum calculation of the IP header is valid, then the node in the RAN determines that the original DSCP value corresponds to the selected DSCP value out of all the possible DSCP values which are valid.

If the header checksum calculation of the IP header is not valid, then the node in the RAN selects a second DSCP value out of all the possible DSCP values which are valid, performs an exclusive OR operation on the checksum and the selected second DSCP value. The checksum operation results in a second checksum result. The node in the RAN then performs an IP header checksum calculation of the IP header using the second checksum result, and checks if the result from the IP header checksum calculation is valid.

If the IP header checksum calculation of the IP header is valid, then the node in the RAN determines that the original DSCP value corresponds to the selected second DSCP value out of all the possible DSCP values which are valid.

If the header checksum calculation of the IP header is not valid, then the node in the RAN selects a third DSCP value out of all the possible DSCP values which are valid, and repeats the procedure again. The procedure is repeated by the node in the RAN until the original DSCP value is obtained or until all possible DSCP values have been used.

In case the original DSCP value cannot be restored 239 the node in the RAN, the node in the RAN either discards the IP packet or forwards the IP packet to the destination terminal with the DSCP value in the IP header un-restored or un-changed.

Figure 2D:
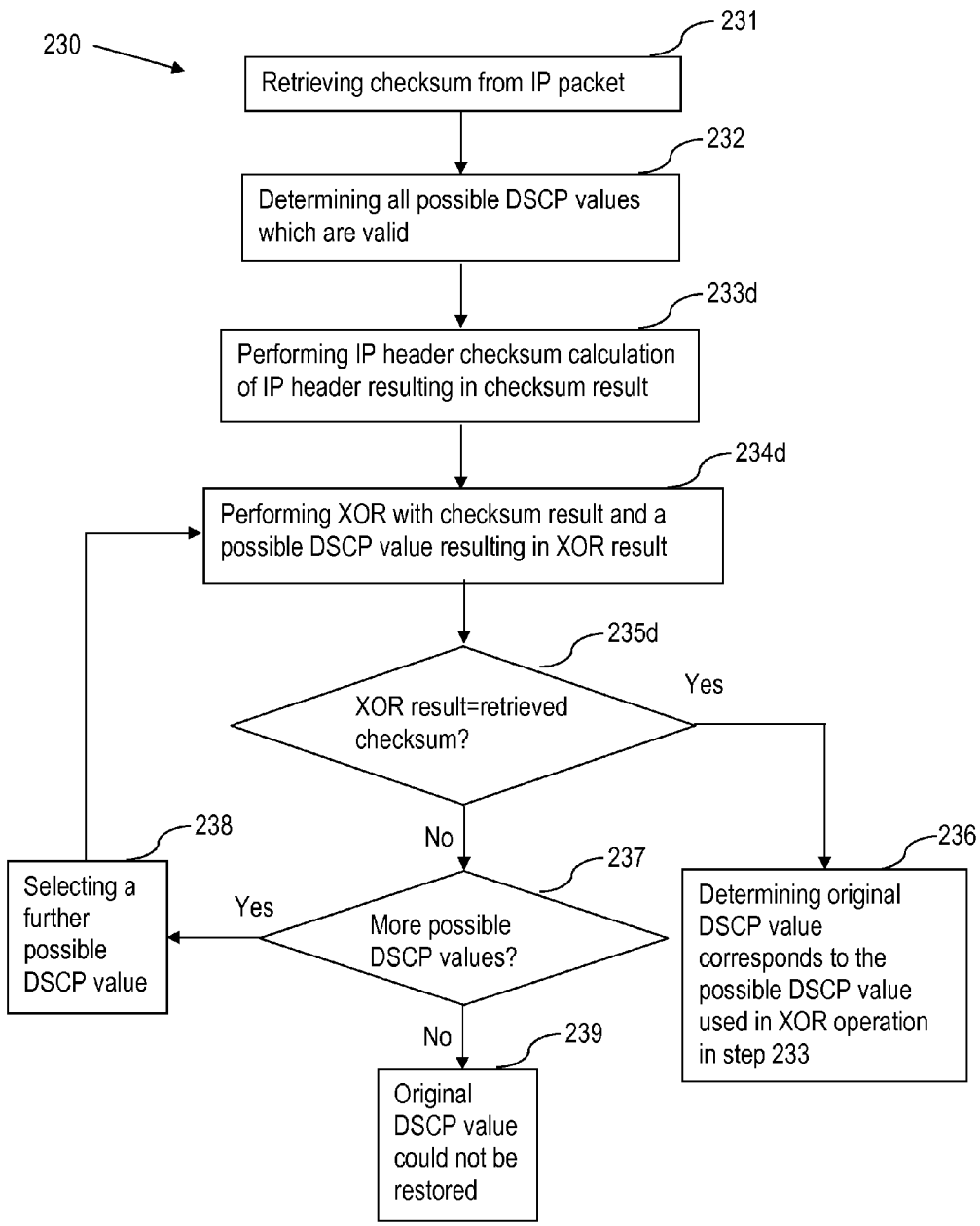
FIG. 2d is a flowchart of a method in a node in a RAN for delivering a received IP packet to a destination terminal according to still another exemplifying embodiment.

In another example, illustrated in FIG. 2d, determining 230 the original DSCP value comprises retrieving 231 a checksum from the IP packet and determining 232 all possible DSCP values which are valid. The method also comprises performing 233d an IP header checksum calculation resulting in a checksum result. The method also comprises to for at least one of all possible DSCP values performing 234d an exclusive OR operation with the checksum result and a possible DSCP value resulting in an XOR result, and checking 235d if the XOR result equals the retrieved checksum. If the XOR result equals the retrieved checksum, the original DSCP value is determined to correspond to the DSCP value which was used in the exclusive OR operation, and if the XOR result does not equal the retrieved checksum, then the method steps above are repeated for a further possible DSCP value until an XOR result equals the retrieved checksum or until all possible DSCP values have been used in the method steps above.

In this example, the node in the core network has removed the original DSCP value from the IP header of the IP header and replaced it with another determined DSCP value (referred to above in conjunction with FIGS. 1a-1d as the second DSCP value), prior to forwarding it to the node in the RAN. Hence, when the node in the RAN receives the packet, the node in the RAN needs to recover the original DSCP value before delivering the IP packet to the destination terminal. In order for the node in the RAN to be able to recover the original DSCP value, the node in the core network added the checksum from the IP packet in addition to replacing the original DSCP value with the DSCP value present in the IP header when the node in the RAN receives the IP packet. In other words, the core network added the checksum from the IP packet in addition to replacing the original DSCP value with the second DSCP value, the term second DSCP value being used in conjunction with the description of FIGS. 1a-1c.

The node in the RAN determines 232 all possible DSCP values which are valid. As described above, all valid DSCP values are comprised in, or generated from, the first pool of DSCP values. In one example, the node in the RAN stored all possible DSCP values which are valid in a memory comprised in the node in the RAN.

The method also comprises performing 233d an IP header checksum calculation resulting in a checksum result. The node in the RAN calculates the IP header checksum by first setting the field of the IP header checksum in the IP header to zero after retrieving the IP header checksum from the IP header. In this way, the retrieved IP header checksum does not affect the IP header checksum calculation resulting in the checksum result.

The node in the RAN selects one DSCP value out of all the possible DSCP values which are valid. The node in the RAN performs 234d an exclusive OR operation with the checksum result and the possible DSCP value resulting in an XOR result. Then the node in the RAN checks 235d if the XOR result equals the retrieved checksum. If the XOR result equals the retrieved checksum, the original DSCP value is determined to correspond to the DSCP value which was used in the exclusive OR operation, and if the XOR result does not equal the retrieved checksum, then the method steps above are repeated for a further possible DSCP value until an XOR result equals the retrieved checksum or until all possible DSCP values have been used in the method steps above.

In case the original DSCP value cannot be restored 239 the node in the RAN, the node in the RAN either discards the IP packet or forwards the IP packet to the destination terminal with the DSCP value in the IP header un-restored or un-changed.

In still another example determining 230 the original DSCP value comprises performing a reverse mapping operation by means of a look-up table in order to determine the original DSCP value.

In another example, the original DSCP value is not comprised in the IP header of the IP packet, nor is the original DSCP value retrievable or recoverable from a checksum of the packet. Instead, the node in the core network has derived the retrieved DSCP value by means of a mapping operation. This means that there is a mapping table in both the node in the core network and the node in the RAN. The node in the RAN may then recover the original DSCP value by performing a reverse mapping operation. The node in the core network receives an IP packet with a DSCP value A, i.e. the original DSCP value, wherein value A belongs to the first pool. Values from the other two pools are not used for the original DSCP value. Based on e.g. DPI and some subscriber info and the received DSCP value the node in the packet core network generates a DSCP value from e.g. the second pool, i.e. there is some look-up table description using e.g. a 3 tupel (original DSCP, DPI result, subscriber information) as an input and a DSCP value from the 2nd pool will result as output from the look-up table description. In order for the node in the RAN to determine the original DSCP value, the node in the RAN performs a reverse mapping operation.

Embodiments herein also relate to a node in a core network adapted for informing a node in a RAN about a type of service associated with an IP packet to be delivered to the node in the RAN. The node in the core network has the same technical features, objects and advantages as the method therein or performed by the node in the core network. Therefore, the node in the core network will only be described in brief in order to avoid unnecessary repetition.

Figure 3:
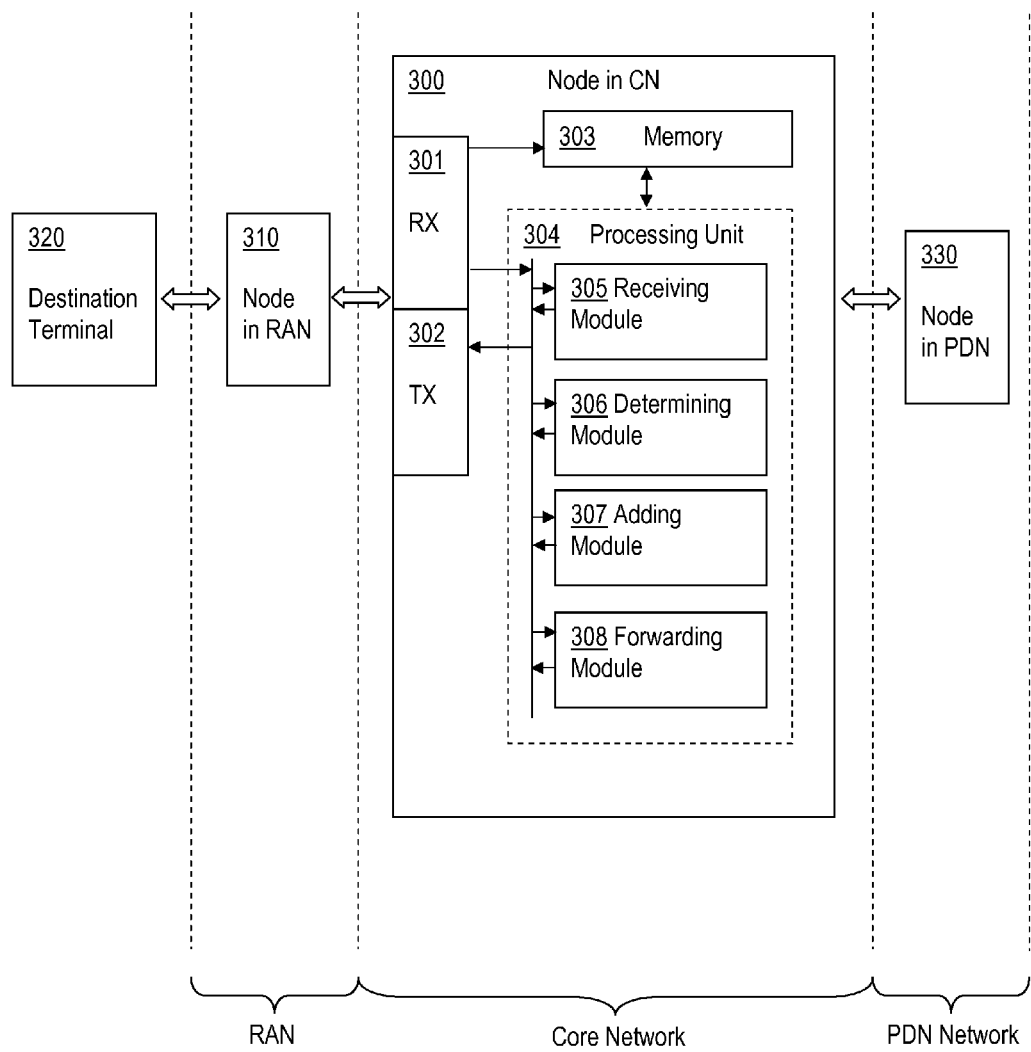
FIG. 3 is a block diagram of a node in a core network for informing a node in a Radio Access Network, RAN, about a type of service associated with an IP packet to be delivered to the node in the RAN, according to an exemplifying embodiment.

FIG. 3 is a block diagram of a node 300 in a core network for informing a node 310 in a Radio Access Network, RAN, about a type of service associated with an IP packet to be delivered to the node 310 in the RAN, according to an exemplifying embodiment. FIG. 3 illustrates the node 300 comprising a processing unit 304 adapted to receive the IP packet from a packet data network, the IP packet having an IP header comprising an original value; and to determine a type of service associated with the IP packet based on information comprised in the IP packet. The processing unit 304 is adapted to determine a second DSCP value based at least partly on the type of service of the IP packet; and to add the determined second DSCP value to the IP header of the IP packet. Further, the processing unit 304 is adapted to forward the IP packet to the node 310 in the RAN, to subsequently be delivered to the destination terminal, thereby enabling the node 310 in the RAN to identify the type of service based on the second DSCP value for further processing of the IP packet when delivering the IP packet to the destination terminal.

FIG. 3 illustrates the node 300 in the core network comprising a memory 303 and a receiving arrangement 301 and a transmitting arrangement 302 by means of which the node 300 in the core network may communicate to the node 310 in the RAN and the node 330 in the PDN. The node 300 in the core network is illustrated in an exemplifying manner comprising the processing unit 304 which in turn is illustrated comprising dedicated modules 305-308 for performing different actions taken by the node 300 in the core network.

The receiving and transmitting arrangements 301 and 302 may be separate arrangements or one Interface arrangement to the node 310 in the RAN and the node 330 in the PDN. Alternatively, in an example, the node 300 in the core network comprises one single interface arrangement by means of which the node 300 in the core network communicate with both the node 310 in the RAN and the node 330 in the PDN. The node 300 in the core network may comprise additional or other modules, units or devices than those schematically illustrated in FIG. 3 for performing the actions described above. The node 300 in the core network may communicate with the node 310 in the RAN and the node 330 in the PDN by means of radio links and/or wires.

It shall be pointed out that this is merely an illustrative example and the node in the core network may comprise more, less or other units or modules which execute the functions of the node in the core network in the same manner as the units illustrated in FIG. 3.

The node 300 in the core network has the same advantages as the method therein or performed by the node 300 in the core network. One advantage is that the node in the RAN is enabled to identify the type of service based on the second DSCP value for further processing of the IP packet when delivering the IP packet to the destination terminal. The node in the RAN is also enabled to recover the original DSCP value such that no IP packets will be dropped due to unexpected DSCP value at the receiving destination terminal. Further, the method may be implemented in different nodes in the core network making the implementation flexible.

In an example, the processing unit 304 is adapted to perform Deep Packet Inspection, DPI, on the received IP packet in order to determine the type of service of the IP packet.

According to another example, the processing unit 304 is adapted to perform IP header Inspection on the IP header of the received IP packet in order to determine the type of service of the IP packet.

According to still an example, the processing unit 304 is adapted to determine the second DSCP value at least partly based on the original DSCP value.

According to yet an example, the processing unit 304 is adapted to determine the second DSCP value at least partly based on a priority associated with the destination receiver of the IP packet.

According to an example, the processing unit 304 is adapted to add the determined second DSCP value to the IP header of the IP packet and at the same time keep the original DSCP value in the IP header of the IP packet such that both the original and the second DSCP values are comprised in the IP header of the IP packet.

According to another example, the processing unit 304 is adapted to determine an IP header checksum with the original DSCP value comprised in the IP header, to perform an exclusive OR operation of the second DSCP value and the determined IP header checksum, and to add the result of the exclusive or operation to the IP packet before forwarding the IP packet to the node in the RAN.

According to still another example, the processing unit is adapted to replace the original DSCP value with the second DSCP value, to determine an IP header checksum, to perform an exclusive OR operation of the original DSCP value and the determined IP header checksum, to and to add the result of the exclusive or operation to the IP packet before forwarding the IP packet to the node in the RAN.

In yet an example, the node 300 in the core network is any of a Packet Data Network Gateway, PDN-GW, a Serving GW, SGW, a Gateway General Packet Radio Service Support Node, GGSN, and a Serving General Packet Radio Service Support Node, SGSN.

Embodiments herein also relate to a node in a RAN adapted for delivering a received IP packet to a destination terminal, the IP packet being received from a node in a core network. The node in the RAN has the same technical features, objects and advantages as the method therein or performed by the node in the RAN. Therefore, the node in the RAN will only be described in brief in order to avoid unnecessary repetition.

Figure 4:
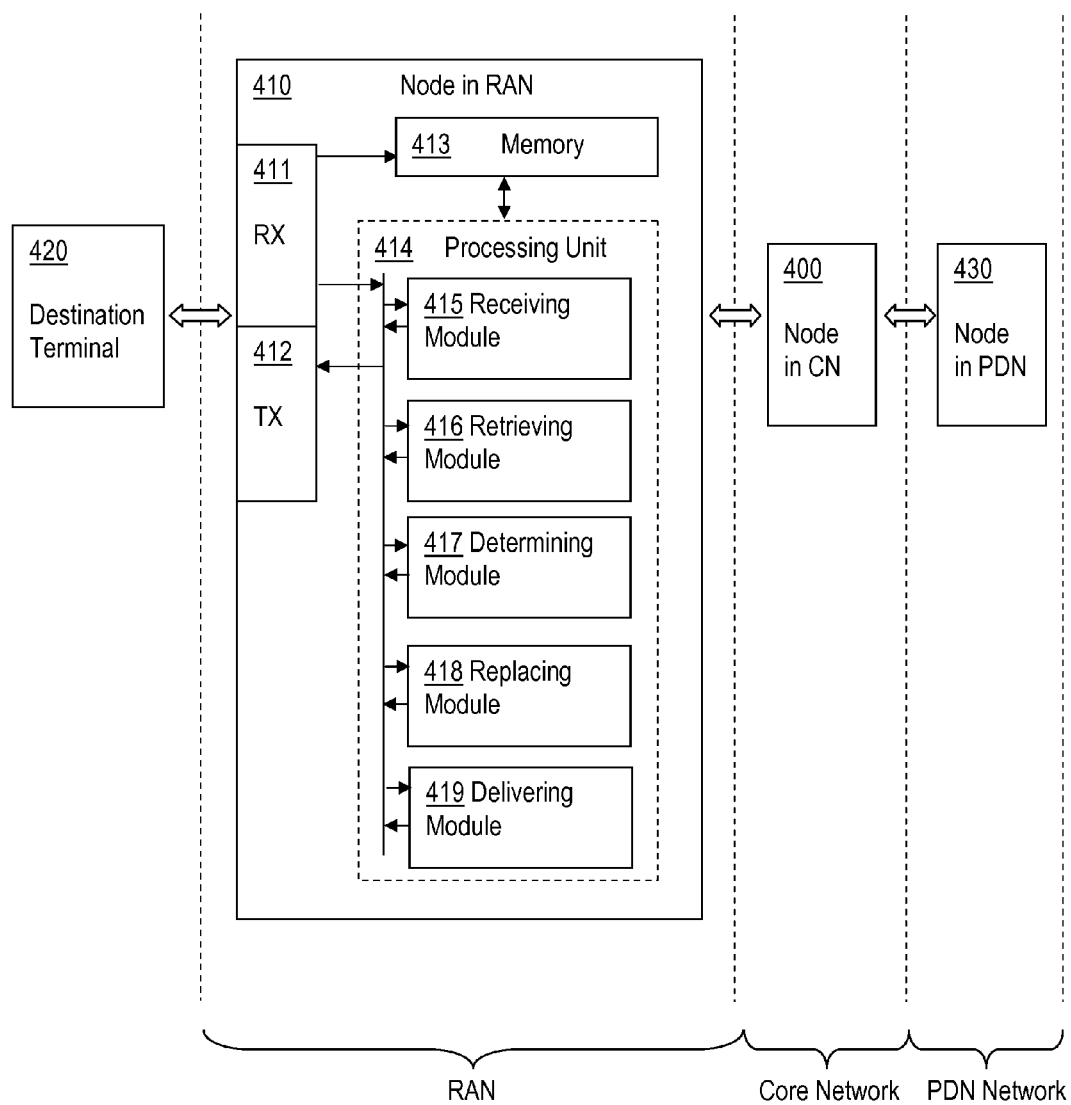
FIG. 4 is a block diagram of a node in a RAN for delivering a received IP packet to a destination terminal, according to an exemplifying embodiment.

FIG. 4 is a block diagram of a node 410 in a RAN for delivering the received IP packet to the destination terminal, the IP packet being received from the node 400 in the core network. FIG. 4 illustrates the node 410 in the RAN comprising a processing unit 414 adapted to receive the IP packet from the node in the core network; and to retrieve a DSCP value comprised in an IP header of the IP packet. The processing unit 414 is also adapted to determine an original DSCP value based on the IP header of the IP packet; and to replace the retrieved DSCP value with the original DSCP value. Further, the processing unit 414 is adapted to deliver the IP packet to the destination terminal using the DSCP value comprised in the IP header.

FIG. 4 illustrates the node 410 in the RAN comprising a memory 413 and a receiving arrangement 411 and a transmitting arrangement 412 by means of which the node 410 in the RAN may communicate to the node 400 in the core network and the destination terminal 420. The node 410 in the RAN is illustrated in an exemplifying manner comprising the processing unit 414 which in turn is illustrated comprising dedicated modules 415-419 for performing different actions taken by the node 410 in the RAN.

The receiving and transmitting arrangements 411 and 412 may be separate arrangements or one Interface arrangement to the node 400 in the core network and the destination terminal 420. Alternatively, in an example, the node 410 in the RAN comprises one single interface arrangement by means of which the node 410 in the RAN communicates with both the node 400 in the core network and the destination terminal 420. The node 410 in the RAN may comprise additional or other modules, units or devices than those schematically illustrated in FIG. 4 for performing the actions described above. The node 410 in the RAN may communicate with the node 400 in the core network and the destination terminal 420 by means of radio links and/or wires.

It shall be pointed out that this is merely an illustrative example and the node in the RAN may comprise more, less or other units or modules which execute the functions of the node in the RAN in the same manner as the units illustrated in FIG. 4.

The node 410 in the RAN has the same advantages as the method therein or performed by the node 410 in the RAN. One advantage is that the node in the RAN is enabled to identify the type of service based on the second DSCP value for further processing of the IP packet when delivering the IP packet to the destination terminal. The node in the RAN is also enabled to recover the original DSCP value such that no IP packets will be dropped due to unexpected DSCP value at the receiving destination terminal.

In an example, the processing unit 414 is further adapted to identify a service type using the DSCP value comprised in the IP header, and to determine, based on the service type, prioritisation, Quality of Service, QoS, handling and/or scheduling decisions to be used for delivering the IP packet to the destination terminal.

In yet an example, the processing unit 414 is adapted to determine the original DSCP value by retrieving the original DSCP value from the IP header of the IP packet.

In still an example, the processing unit 414 is adapted to, for at least one of all possible DSCP values, perform an exclusive OR operation with the checksum and a possible DSCP value resulting in a checksum result; to perform an IP header checksum calculation of the IP header using the checksum result; and to check if the result from the IP header checksum calculation is valid. If the result is valid, the processing unit 414 is adapted to determine the original DSCP value to correspond to the DSCP value which was used in the exclusive OR operation, and if the result is not valid, then the processing unit is adapted to repeat the operations above for a further possible DSCP value until a valid result is obtained or until all possible DSCP valued has been used in the operations above, in order to determine the original DSCP value.

In still an example, the processing unit 414 is adapted to perform an IP header checksum calculation resulting in a checksum result. The processing unit 414 is further adapted to, for at least one of all possible DSCP values, perform an exclusive OR operation with the checksum result and a possible DSCP value resulting in an XOR result, and to check if the XOR result equals the retrieved checksum. If the XOR result equals the retrieved checksum, the processing unit 414 is adapted to determine the original DSCP value to correspond to the DSCP value which was used in the exclusive OR operation, and if the XOR result does not equal the retrieved checksum, then the processing unit 414 is adapted to repeat the operations above for a further possible DSCP value until a valid result is obtained or until all possible DSCP valued has been used in the operations above, in order to determine the original DSCP value.

In still an example, the processing unit 414 is adapted to determine the original DSCP value by performing a reverse mapping operation by means of a look-up table in order to determine the original DSCP value Below, an example follows of when an original DSCP value is mapped to a DSCP value comprised in e.g. the second pool of DSCP values.

The PDU containing the original DSCP-field code point code point "000010", that has some meaning with regards to the implemented Radio Resource Management in the RAN, has been received in the node in the core network. Furthermore, the information provided by the DPI function indicates "e-mail". The node in the core network knows, or determines, that the subscriber, i.e. the destination terminal, has a particular subscribed priority "A". This 3-tuple (original DSCP-field, application type, subscriber priority) is then be mapped into a reserved DSCP-field value with a code point from the second pool "000011". The reception of a DSCP-field with the reserved code-point "000011" from the second pool can have some pre-configured Radio Resource Management behaviour applied in the node in the RAN that reflects operator's preferences. Finally, the node in the RAN is configured to understand the mapping of the standardized DSCP-field code points into the set of reserved DSCP code points, and thus the node in the RAN re-sets the DSCP-field back to its original code point "000010" before transmitting the IP packet the destination terminal over the radio interface.

Hence, as outlined in the example above, by using the reserved DSCP code points from the second pool to encode the original DSCP code point, the node in the RAN that receives the modified DSCP-field has the capability to re-set the DSCP-field back to the original DSCP code point.

Below follows another example illustrating the exclusive OR operation of the DSCP field with the IP header checksum. The procedure makes use of the 16 bit long IP header checksum.

The node in the core network modifies the DSCP-field in the IP header in accordance with some definition that is based on subscriber, device information combined with the result regarding the type of service/application contained in the PDU delivered by the DPI function. This operation basically addresses the concept of delivering some indication to the RAN regarding the preferred choice of RRM strategies. The node in the core network performs XOR operation of the original DSCP-field with the calculated checksum of the IP-header. It is assumed that the PDU receiving node in the node in the RAN is configured to know the possible DSCP code points from the first pool. It is further assumed that the node in the RAN is capable of performing an XOR operation of each possible valid DSCP code point from the first pool with the IP header checksum to recover the checksum, i.e. a correct checksum will be the one that has been obtained by XOR'ing it with the valid/correct/original DSCP code point. The node in the RAN will re-set the DSCP-field to its original code point based on the successful operation described in the second bullet above prior to the transmission to the destination terminal over the radio interface.

FIG. 5a is a schematic overview of an example of a packet switched communication network connected to a packet data network, PDN 500. The packet switched communication network in FIG. 5 employs the GPRS technology. The GPRS communication network is connected to the PDN 500 by means of a gateway, which in GPRS is called a GGSN 510. The GGSN 510 is responsible for the interworking between the GPRS network and the PDN 500. Some examples of a PDN 500 are the Internet and X.25 networks. When the GGSN 510 receives data addressed to a specific destination terminal or user 550, the GGSN 510 checks if the destination terminal 550 is active. If it is, the GGSN 510 forwards the data to the SGSN 520 serving the destination terminal 550, but if the destination terminal 550 is inactive, the data are discarded. On the other hand, mobile-originated packets are routed to the right network by the GGSN 510. It shall be noted that ciphering in the SGSN is not active in order for the method described above is to be executed.

The SGSN 520 handles all packet switched data within the network, e.g. the mobility management and authentication of the users 550. The SGSN 520 performs the same functions as the Mobile Switching Centre, MSC, 570 for voice traffic. The SGSN 520 and the MSC 570 may be co-located. The SGSN 520 is connected to the Base Station Controller, BSC 530a. The SGSN 520 is the service access point to the GPRS network for the mobile user 550. On the other side the SGSN 520 relays the data between the SGSN 520 and relevant GGSN 510 (and vice versa). The BSC 530a is in control of and supervises a number of Base Transceiver Stations, BTS 540a. The BSC 530a is responsible for the allocation of radio resources to a mobile call and for the handovers that are made between BTSs 540a under its control. Other handovers are under control of the MSC 570.

FIG. 5a also illustrates the communication network comprising an Equipment Identity Register, EIR, 560 which is a database that contains a record of the all the mobile stations, MS 550 that are allowed in a network as well as an database of all equipment that is banned, e.g. because it is lost or stolen.

The identity of the mobile station is given by the International Mobile Equipment Identity, IMEI. Each time a call is made, the MSC 570 requests the IMEI of the mobile station 550, which is then send to the EIR for authorisation.

The GGSN and the SGSN are two examples of nodes in the core network in which the method described above may be implemented.

Figure 5B:
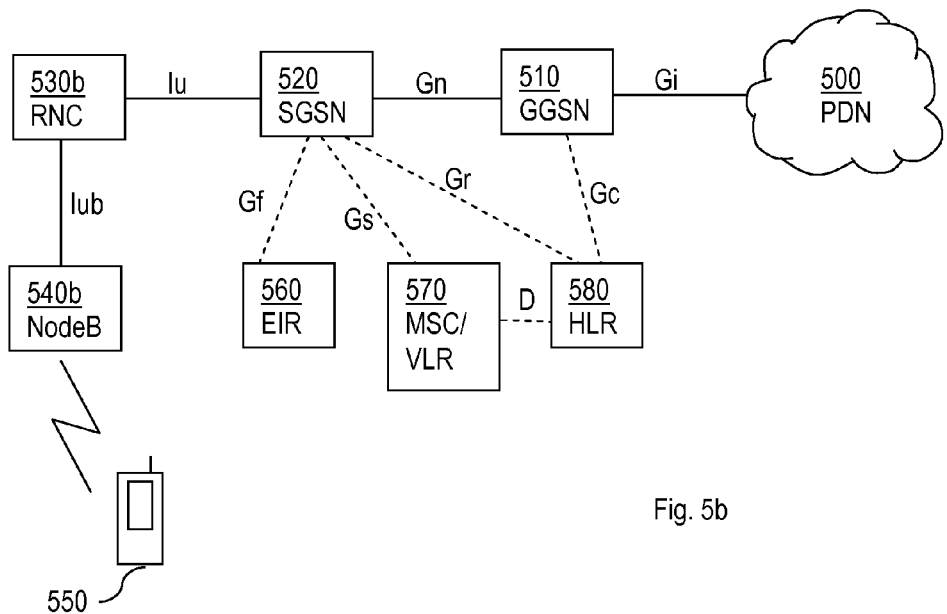
FIG. 5b is a schematic overview of an example of another packet switched communication network connected to a packet data network, PDN.

FIG. 5b is a schematic overview of an example of a packet switched communication network connected to a packet data network, PDN 500. The packet switched communication network in FIG. 5b employs the Universal Mobile Telecommunications System, UMTS, technology. The UMTS communication network is connected to the PDN 500 by means of a gateway, which in UMTS is called a GGSN 510. The GGSN 510 is responsible for the interworking between the UMTS network and the PDN 500. Some examples of a PDN 500 are the Internet and X.25 networks. The SGSN 520 handles control plane signalling within the network, e.g. the mobility management and authentication of the users 550. The SGSN 520 performs similar functions as the Mobile Switching Centre, MSC, 570 for voice traffic. The SGSN 520 and the MSC 570 may be co-located. The SGSN 520 is the service access point to the UMTS network for the mobile user 550. On the other side the SGSN 520 may relay the data between the Radio Network Controller, RNC, 530b, and relevant GGSN 510 (and vice versa). The RNC 530b is in control of and supervises a number of NodeBs, 540b. The NodeB 540b is responsible for the allocation of radio resources to a mobile call and for the handovers that are made between NodeBs 540b under its control.

FIG. 6 is a schematic overview of another example of a packet switched communication network connected to a packet data network, PDN 600. The packet switched communication network in FIG. 6 employs the LTE technology. The LTE communication network is connected to the PDN 600 by means of a gateway, which in LTE is called a PGW 610.

The PDN Gateway, PGW 610 provides connectivity from the UE 660a, 660b to external PDNs 600 by being the point of exit and entry of traffic for the UE 660a, 660b. A UE 660a, 660b may have simultaneous connectivity with more than one PGW 610 for accessing multiple PDNs. The PGW 610 performs policy enforcement, packet filtering for each user 660a, 660b, charging support, lawful interception and packet screening. Another key role of the PGW is to act as the anchor for mobility between 3GPP and non-3GPP technologies.

The PGW is connected to the serving gateway SGW 630. The SGW routes and forwards user data packets, while also acting as the mobility anchor for the user plane during inter-eNodeB, eNB, 650a, 650b handovers and as the anchor for mobility between LTE and other 3GPP technologies (terminating S4 interface and relaying the traffic between 2G/3G systems and PGW). For idle state UEs, the SGW 630 terminates the downlink data path and triggers paging when downlink data arrives for the UE. It manages and stores UE contexts, e.g. parameters of the IP bearer service, network internal routing information. It also performs replication of the user traffic in case of lawful interception.

The PGW 610 and the SGW 630 are two examples of nodes in the core network in which the method described above may be implemented.

FIG. 6 further illustrates a Policy and Charging Rules Function or PCRF 620. This particular component of LTE is responsible for supporting the detection of service data flow, the charging system based on this data flow, and policy enforcement. The PCRF 620 is connected to a Subscriber Profile Repository, SPR 620. An operator may keep their existing HLR as it is with no need to upgrade to a full-fledged HSS.

Further, another node of the LTE network is the Mobility Management Entity, MME 640. The MME is the key control-node for the LTE access-network. It is responsible for idle mode User equipment, UE 660a, 660b, tracking area updating and paging procedure including retransmissions. It is involved in the bearer activation/deactivation process and is also responsible for choosing the SGW 630 for a UE 660a, 660b at the initial attach and at time of intra-LTE handover involving Core Network node relocation. It is responsible for authenticating the user by interacting with the HSS 680. The Non Access Stratum, NAS, signalling terminates at the MME and it is also responsible for generation and allocation of temporary identities to UEs 660a, 660b.

It should be noted that FIGS. 3 and 4 merely illustrates various functional units in the node in the core network and the node in the RAN respectively in a logical sense. The functions in practice may be implemented using any suitable software and hardware means/circuits etc. Thus, the embodiments are generally not limited to the shown structures of the node in the core network and the node in the RAN and the functional units. Hence, the previously described exemplary embodiments may be realised in many ways. For example, one embodiment includes a computer-readable medium having instructions stored thereon that are executable by the processing unit for executing the method steps in the node in the core network and the node in the RAN respectively. The instructions executable by the computing system and stored on the computer-readable medium perform the method steps of the node in the core network and the node in the RAN as set forth in the claims.

Figure 7:
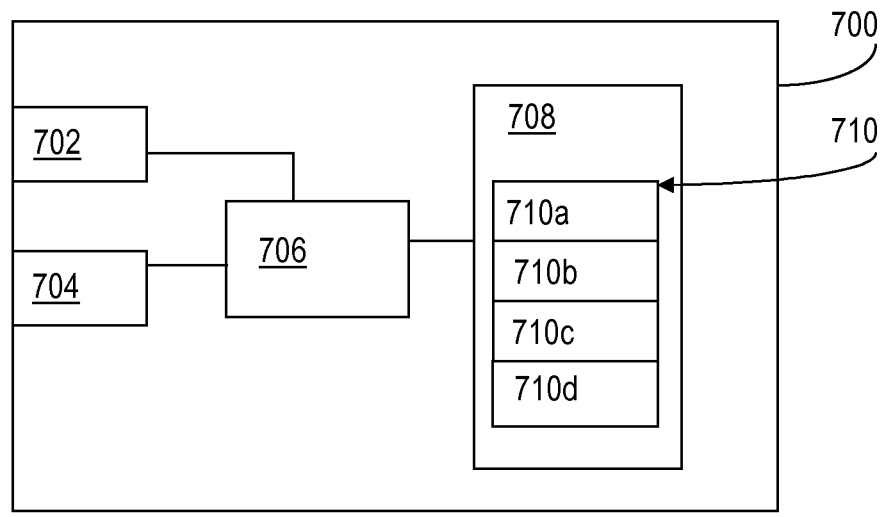
FIG. 7 is a schematic view illustrating an arrangement, according to an embodiment.

FIG. 7 schematically shows an embodiment of an arrangement 700 in a node in a core network, which also can be an alternative way of disclosing an embodiment of the processing unit 304 in the node 300 in the core network illustrated in FIG. 3. Comprised in the arrangement 700 are here a processing unit 706, e.g. with a DSP (Digital Signal Processor) and an encoding and a decoding module. The processing unit 706 can be a single unit or a plurality of units to perform different steps of procedures or methods described herein. The arrangement 700 also comprises the input unit 702 for receiving signals or packets, and the output unit 704 for output signal(s) or packets. The input unit 702 and the output unit 704 may be arranged as one in the hardware of the arrangement. In an example, the input unit 702 corresponds to the receiving arrangement 301 in FIG. 3 and the output unit 704 corresponds to the transmitting arrangement 302 in FIG. 3.

Furthermore the arrangement 700 comprises at least one computer program product 708 in the form of a non-volatile memory, e.g. an EEPROM (Electrically Erasable Programmable Read-Only Memory), a flash memory and a disk drive. The computer program product 708 comprises a computer program 710, which comprises code means, which when run in the processing unit 706 in the arrangement 700 causes the arrangement and/or the node in the core network to perform the steps of the procedure described earlier in conjunction with FIGS. 1a and 1b.

Hence in the exemplary embodiments described, the code means in the computer program 710 of the arrangement 700 comprises a receiving module 710a for receiving the IP packet from a packet data network, the IP packet having an IP header comprising an original Differentiated Services Code Point, DSCP, value. The computer program may further comprise a determining module 710b for determining a type of service associated with the IP packet based at least partly on information comprised in the IP packet; and for determining 130 a second DSCP value based at least partly on the type of service of the IP packet. The computer program may further comprise an adding module 710c for adding the determined second DSCP value to the IP header of the IP packet. The computer program could further comprise a forwarding module 710d for forwarding the IP packet to the node in the RAN, to subsequently be delivered to a destination terminal. The computer program 710 is in the form of computer program code structured in computer program modules. The modules 710a-d essentially perform the steps of the flows illustrated in FIGS. 1a and 1b to emulate the arrangement in node in the core network illustrated in FIG. 3. In other words, when the different modules 710a-d are run on the processing unit 706, they correspond to the modules 305-308 of FIG. 3.

Figure 8:
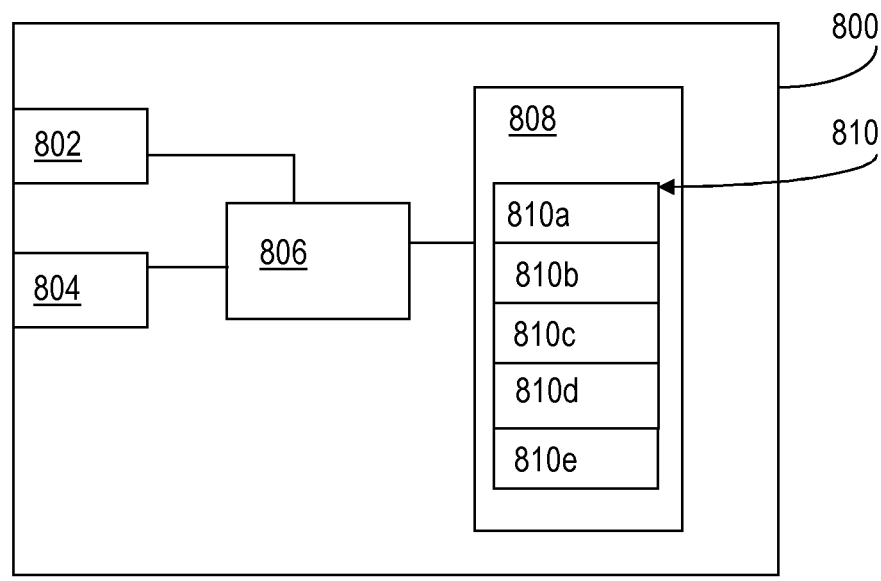
FIG. 8 is a schematic view illustrating an arrangement, according to an embodiment.

FIG. 8 schematically shows an embodiment of an arrangement 800 in a node in a RAN, which also can be an alternative way of disclosing an embodiment of the processing unit 414 in the node 410 in the RAN illustrated in FIG. 4. Comprised in the arrangement 800 are here a processing unit 806, e.g. with a DSP (Digital Signal Processor) and an encoding and a decoding module. The processing unit 806 can be a single unit or a plurality of units to perform different steps of procedures or methods described herein. The arrangement 800 also comprises the input unit 802 for receiving signals or packets, and the output unit 804 for output signal(s) or packets. The input unit 802 and the output unit 804 may be arranged as one in the hardware of the arrangement. In an example, the input unit 802 corresponds to the receiving arrangement 411 in FIG. 4 and the output unit 804 corresponds to the transmitting arrangement 412 in FIG. 4.

Furthermore the arrangement 800 comprises at least one computer program product 808 in the form of a non-volatile memory, e.g. an EEPROM (Electrically Erasable Programmable Read-Only Memory), a flash memory and a disk drive. The computer program product 708 comprises a computer program 810, which comprises code means, which when run in the processing unit 806 in the arrangement 800 causes the arrangement and/or the node in the RAN to perform the steps of the procedure described earlier in conjunction with FIGS. 2a-2c.

Hence in the exemplary embodiments described, the code means in the computer program 810 of the arrangement 800 comprises a receiving module 810a for receiving the IP packet from the node in the core network. The computer program may further comprise a retrieving module 810b for retrieving a DSCP value comprised in a IP header of the IP packet. The computer program may further comprise a determining module 810c for determining an original DSCP value based on the IP header of the IP packet. The computer program could further comprise a replacing module 810d for replacing the retrieved DSCP value with the original DSCP value. Still further, the computer program may comprise a delivering module 810e for delivering the IP packet to the destination terminal using the DSCP value comprised in the IP header. The computer program 810 is in the form of computer program code structured in computer program modules. The modules 810a-e essentially perform the steps of the flows illustrated in FIGS. 2a-2c to emulate the arrangement in node in the RAN illustrated in FIG. 4. In other words, when the different modules 810a-e are run on the processing unit 806, they correspond to the modules 415-419 of FIG. 4.

Although the code means in the embodiment disclosed above in conjunction with FIGS. 7 and 8 are implemented as computer program modules which when run on the respective processing unit cause the respective arrangement and/or node in the core network and/or RAN to perform the steps described above in the conjunction with figures mentioned above, at least one of the code means may in alternative embodiments be implemented at least partly as hardware circuits.

The processor may be a single CPU (Central processing unit), but could also comprise two or more processing units.

For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within node in the core network and the node in the RAN respectively.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method in a node in a core network, for informing a node in a Radio Access Network, RAN, about a type of service associated with an IP packet to be delivered to the node in the RAN, the method comprising:
   receiving the IP packet from a packet data network, the IP packet having an IP header comprising an original Differentiated Services Code Point, DSCP, value;
   determining a type of service associated with the IP packet by one of Deep Packet Inspection, DPI, on the received IP packet or by header inspection of the IP header;
   determining a second DSCP value based at least partly on the type of service of the IP packet;
   adding the determined second DSCP value to the IP header of the IP packet; and
   forwarding the IP packet to the node in the RAN, to subsequently be delivered to a destination terminal,
   thereby enabling the node in the RAN to identify the type of service based on the second DSCP value for further processing of the IP packet when delivering the IP packet to the destination terminal.

2. The method according to claim 1, wherein the determining the second DSCP value is based at least partly on the original DSCP value.

3. The method according to claim 1, wherein the determining the second DSCP value is based at least partly on a priority associated with the destination receiver of the IP packet.

4. The method according to claim 1, wherein the adding of the determined second DSCP value to the IP header of the IP packet comprises one of:

keeping the original DSCP value in the IP header of the IP packet such that both the original and the second DSCP values are comprised in the IP header of the IP packet;
removing the original DSCP value from a DSCP field of the IP header, inserting the second DSCP value to the DSCP field of the IP header and forwarding the IP packet to the node in the RAN, wherein the second DSCP value has been determined by means of a mapping operation; or
replacing the original DSCP value with the second DSCP value, determining an IP header checksum, performing an exclusive OR operation of the original DSCP value and the determined IP header checksum and adding the result of the exclusive OR operation to the IP packet before forwarding the IP packet to the node in the RAN.

5. The method according to claim 1, wherein the node in the core network is any of a Packet Data Network Gateway, PDN-GW, a Serving GW, SGW, a Gateway General Packet Radio Service Support Node, GGSN, and a Serving General Packet Radio Service Support Node, SGSN.

6. A method in a node in a Radio Access Network, RAN, for delivering a received IP packet to a destination terminal, the IP packet being received from a node in a core network, the method comprising:
   receiving the IP packet from the node in the core network;
   retrieving a DSCP value comprised in an IP header of the IP packet;
   identifying a service type using the retrieved DSCP value comprised in the IP header;
   determining, based on the service type: prioritization, Quality of Service, QoS, handling and/or scheduling decisions to be used for delivering the IP packet to the destination terminal;
   determining an original DSCP value based on the IP header of the IP packet;
   replacing the retrieved DSCP value with the original DSCP value; and
   delivering the IP packet to the destination terminal using the original DSCP value comprised in the IP header.

7. The method according to claim 6, wherein determining the original DSCP value comprises retrieving the original DSCP value from the IP header of the IP packet.

8. The method according to claim 6, wherein determining the original DSCP value comprises:
   retrieving a checksum from the IP packet;
   determining all possible DSCP values which are valid; and
   for at least one of all possible DSCP values:
      performing an exclusive OR operation with the checksum and a possible DSCP value resulting in a checksum result;
      performing an IP header checksum calculation of the IP header using the checksum result; and
      checking if the result from the IP header checksum calculation is valid,
      wherein if the result is valid, the original DSCP value is determined to correspond to the DSCP value which was used in the exclusive OR operation, and if the result is not valid, then repeating the exclusive OR operation, the IP header checksum calculation, and the checking for a further possible DSCP value until a valid result is obtained or until all possible DSCP values have been used.

9. The method according to claim 6, wherein determining the original DSCP value comprises:
   retrieving a checksum from the IP packet;

determining all possible DSCP values which are valid;
performing an IP header checksum calculation resulting in a checksum result; and
for at least one of all possible DSCP values:
  performing an exclusive OR operation with the checksum result and a possible DSCP value resulting in an XOR result; and
  checking if the XOR result equals the retrieved checksum,
  wherein if the XOR result equals the retrieved checksum, the original DSCP value is determined to correspond to the DSCP value which was used in the exclusive OR operation, and if the XOR result does not equal the retrieved checksum, then repeating the exclusive OR operation and the checking for a further possible DSCP value until an XOR result equals the retrieved checksum or until all possible DSCP values have been used.

10. The method according to claim 6, wherein determining the original DSCP value comprises performing a reverse mapping operation by means of a look-up table in order to determine the original DSCP value.

11. A node in a core network, adapted for informing a node in a Radio Access Network, RAN, about a type of service associated with an IP packet to be delivered to the node in the RAN, the node in the core network comprising:
a processing unit; and
memory containing instructions that, when executed by the processing unit, cause the node in the core network to:
  receive the IP packet from a packet data network, the IP packet having an IP header comprising an original Differentiated Services Code Point, DSCP, value;
  determine a type of service associated with the IP packet by one of Deep Packet Inspection, DPI, on the received IP packet or by header inspection of the IP header;
  determine a second DSCP value based at least partly on the type of service of the IP packet;
  add the determined second DSCP value to the IP header of the IP packet; and
  forward the IP packet to the node in the RAN, to subsequently be delivered to the destination terminal,
  thereby enabling the node in the RAN to identify the type of service based on the second DSCP value for further processing of the IP packet when delivering the IP packet to a destination terminal.

12. The node according to claim 11, wherein the processing unit is adapted to determine the second DSCP value at least partly based on the original DSCP value.

13. The node according to claim 11, wherein the processing unit is adapted to determine the second DSCP value at least partly based on a priority associated with the destination receiver of the IP packet.

14. The node according to claim 11, wherein as part of adding the determined second DSCP value to the IP header of the IP packet, the processing unit is adapted to one of:
  keep the original DSCP value in the IP header of the IP packet such that both the original and the second DSCP values are comprised in the IP header of the IP packet;
  remove the original DSCP value from a DSCP field in the IP header, insert the second DSCP value to the DSCP field, and forward the IP packet to the node in the RAN; or
  replace the original DSCP value with the second DSCP value, determine an IP header checksum, perform an exclusive OR operation of the original DSCP value and the determined IP header checksum, and add the result of the exclusive OR operation to the IP packet before forwarding the IP packet to the node in the RAN.

15. The node according to claim 11, wherein the node in the core network is any of a Packet Data Network Gateway, PDN-GW, a Serving GW, SGW, a Gateway General Packet Radio Service Support Node, GGSN, and a Serving General Packet Radio Service Support Node, SGSN.

16. A node in a Radio Access Network, RAN, adapted for delivering a received IP packet to a destination terminal, the IP packet being received from a node in a core network, the RAN node comprising:
a processing unit; and
memory containing instructions that, when executed by the processing unit, cause the node in the RAN to:
  receive the IP packet from the node in the core network;
  retrieve a DSCP value comprised in an IP header of the IP packet;
  identify a service type using the retrieved DSCP value comprised in the IP header;
  determine, based on the service type: prioritization, Quality of Service, QoS, handling and/or scheduling decisions to be used for delivering the IP packet to the destination terminal;
  determine an original DSCP value based on the IP header of the IP packet;
  replace the retrieved DSCP value with the original DSCP value; and
  deliver the IP packet to the destination terminal using the original DSCP value comprised in the IP header.

17. The node in the RAN according to claim 16, wherein the processing unit is adapted to determine the original DSCP value by retrieving the original DSCP value from the IP header of the IP packet.

18. The node in the RAN according to claim 16, wherein the processing unit is adapted to, for at least one of all possible DSCP values:
  perform an exclusive OR operation with the checksum and a possible DSCP value resulting in a checksum result;
  perform an IP header checksum calculation of the IP header using the checksum result; and
  check if the result from the IP header checksum calculation is valid,
  wherein if the result is valid, the processing unit is adapted to determine the original DSCP value to correspond to the DSCP value which was used in the exclusive OR operation, and if the result is not valid, then the processing unit is adapted to repeat the operations above for a further possible DSCP value until a valid result is obtained or until all possible DSCP valued has been used in the operations above, in order to determine the original DSCP value.

19. The node in the RAN according to claim 16, wherein the processing unit is adapted to perform an IP header checksum calculation resulting in a checksum result, and to for at least one of all possible DSCP values:
  perform an exclusive OR operation with the checksum result and a possible DSCP value resulting in an XOR result; and
  check if the XOR result equals the retrieved checksum,
  wherein if the XOR result equals the retrieved checksum, the processing unit is adapted to determine the original DSCP value to correspond to the DSCP value which was used in the exclusive OR operation, and if the XOR result does not equal the retrieved checksum, then the processing unit is adapted to repeat the operations above for a further possible DSCP value until a valid result is obtained or until all possible DSCP valued has been used in the operations above, in order to determine the original DSCP value.

20. The node in the RAN according to claim 16, wherein the processing unit is adapted to determine the original DSCP value by performing a reverse mapping operation by means of a look-up table in order to determine the original DSCP value.

21. A computer program comprising computer readable code means, which when run in one or more processing units of a node in a core network, causes the node in the core network to:
- receive an IP packet from a packet data network, the IP packet having an IP header comprising an original Differentiated Services Code Point, DSCP, value;
- determine a type of service associated with the IP packet by one of Deep Packet Inspection, DPI, on the received IP packet or by header inspection of the IP header;
- determine a second DSCP value based at least partly on the type of service of the IP packet;
- add the determined second DSCP value to the IP header of the IP packet; and
- forward the IP packet to a node in a Radio Access Network, RAN, to subsequently be delivered to a destination terminal, thereby enabling the node in the RAN to identify a type of service associated with the IP packet based on the second DSCP value for further processing of the IP packet when delivering the IP packet to the destination terminal.

22. A computer program comprising computer readable code means, which when run in one or more processing units of a node in a Radio Access Network, RAN, causes the node in the RAN to:
- receive an IP packet from a node in the core network;
- retrieve a DSCP value comprised in an IP header of the IP packet;
- identify a service type using the retrieved DSCP value comprised in the IP header;
- determine, based on the service type: prioritization, Quality of Service, QoS, handling and/or scheduling decisions to be used for delivering the IP packet to the destination terminal;
- determine an original DSCP value based on the IP header of the IP packet;
- replace the retrieved DSCP value with the original DSCP value; and
- deliver the IP packet to a destination terminal.

* * * * *